(12) United States Patent
Jones et al.

(10) Patent No.: US 11,807,396 B2
(45) Date of Patent: Nov. 7, 2023

(54) MIRRORED FABRICATION AND ASSEMBLY OF AIRCRAFT WINGS

(71) Applicant: The Boeing Company, Chicago, IL (US)

(72) Inventors: Darrell D. Jones, Mill Creek, WA (US); Daniel R. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,279

(22) Filed: Nov. 10, 2021

(65) Prior Publication Data
US 2022/0153439 A1     May 19, 2022

Related U.S. Application Data

(60) Provisional application No. 63/115,037, filed on Nov. 18, 2020.

(51) Int. Cl.
   *B64F 5/10*     (2017.01)
   *B64C 3/26*     (2006.01)

(52) U.S. Cl.
   CPC . *B64F 5/10* (2017.01); *B64C 3/26* (2013.01)

(58) Field of Classification Search
   CPC ...... B64C 3/26; B23P 21/004; B23P 2700/01; B64F 5/10
   See application file for complete search history.

(56) References Cited

U.S. PATENT DOCUMENTS

| | | | | |
|---|---|---|---|---|
| 4,894,903 A | * | 1/1990 | Woods | B64F 5/10 29/559 |
| 5,615,474 A | * | 4/1997 | Kellner | G05B 19/41815 29/703 |
| 6,092,275 A | * | 7/2000 | Kellner | G05B 19/41815 29/407.04 |
| 6,129,031 A | * | 10/2000 | Sarh | D05B 25/00 901/41 |

(Continued)

FOREIGN PATENT DOCUMENTS

| | | | | |
|---|---|---|---|---|
| DE | 202008013438 U1 | * | 4/2010 | ............ B64F 5/0009 |
| DE | 102010004857 A1 | * | 7/2011 | ............ B64F 5/0009 |

(Continued)

OTHER PUBLICATIONS

DE-202008013438-U1 Machine Translation (Year: 2010).*

(Continued)

*Primary Examiner* — Michael W Hotchkiss
(74) *Attorney, Agent, or Firm* — Yee & Associates, P.C.

(57) ABSTRACT

Systems and methods are provided for assembly line processing of aircraft wing panels. The method includes inputting wing panels into an assembly line, the assembly line having a number of work stations, the wing panels oriented such that leading edges are all on a first side of the work stations, and trailing edges are all on a second side of the work stations, and advancing the wing panels in a process direction through the number of work stations, at least a first portion of the work stations dedicated to wing panel leading edge processing, and a second portion of the work stations dedicated to wing panel trailing edge processing.

29 Claims, 11 Drawing Sheets

(56) References Cited

U.S. PATENT DOCUMENTS

| | | | | |
|---|---|---|---|---|
| 6,779,272 | B2* | 8/2004 | Day | B64F 5/10 29/407.01 |
| 7,076,856 | B2* | 7/2006 | Sarh | B25B 11/005 29/796 |
| 7,770,477 | B2* | 8/2010 | Hazlehurst | B21J 15/14 73/865.8 |
| 8,661,684 | B1* | 3/2014 | Boyd | B21D 53/92 29/897.2 |
| 9,452,500 | B2* | 9/2016 | Reid | B21J 15/142 |
| 9,486,917 | B2* | 11/2016 | Reid | B25J 11/005 |
| 9,925,629 | B2* | 3/2018 | DesJardien | B23P 19/10 |
| 10,000,298 | B2* | 6/2018 | Cobb | B64F 5/10 |
| 10,363,640 | B2* | 7/2019 | Sisco | B23P 23/00 |
| 10,427,254 | B2* | 10/2019 | Day | B64F 5/10 |
| 10,875,074 | B2* | 12/2020 | Lam | B21D 37/02 |
| 11,267,585 | B2* | 3/2022 | Datas | B21J 15/142 |
| 2004/0040154 | A1* | 3/2004 | Day | B64F 5/10 29/525.01 |
| 2004/0093731 | A1* | 5/2004 | Sarh | B64F 5/10 29/897.3 |
| 2010/0233373 | A1* | 9/2010 | Swanberg | B05B 16/40 118/314 |
| 2011/0054694 | A1* | 3/2011 | Munk | B64F 5/10 700/275 |
| 2012/0011693 | A1* | 1/2012 | Amirehteshami | B23P 21/002 29/33 R |
| 2013/0071573 | A1 | 3/2013 | Brewer et al. | |
| 2015/0314889 | A1* | 11/2015 | Day | B23B 41/00 408/69 |
| 2016/0167724 | A1* | 6/2016 | Kilibarda | B23K 37/047 29/401.1 |
| 2017/0144779 | A1* | 5/2017 | Sisco | B64F 5/10 |
| 2018/0339456 | A1* | 11/2018 | Czinger | B33Y 30/00 |

FOREIGN PATENT DOCUMENTS

| | | | |
|---|---|---|---|
| EP | 2939931 A1 | 4/2015 | |
| GB | 2276600 A * | 10/1994 | B64C 3/18 |
| WO | 2004020286 A1 | 3/2004 | |

OTHER PUBLICATIONS

DE-102010004857-A1 Machine Translation (Year: 2011).*
International Search Report and Written Opinion dated Oct. 28, 2021 regarding NL Application No. NL2028123; 13 pages.
European Patent Office Extended Search Report, dated Apr. 12, 2022, regarding Application No. EP21207553.5, 9 pages.

* cited by examiner

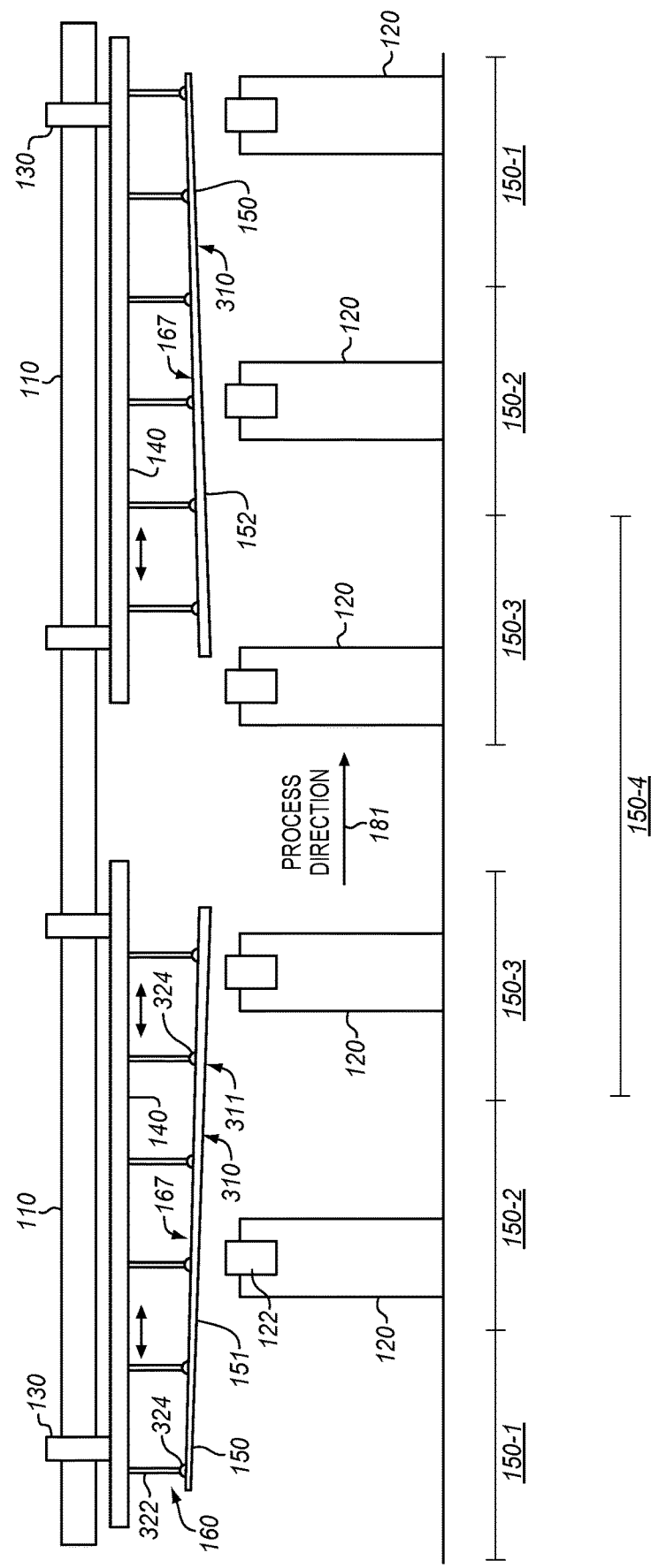

MIRRORED FABRICATION AND ASSEMBLY OF AIRCRAFT WINGS

CROSS-REFERENCE TO RELATED APPLICATION

This application claims the benefit of U.S. Provisional Patent Application Ser. No. 63/115,037 filed Nov. 18, 2020, and entitled "Mirrored Fabrication and Assembly of Aircraft Wings," which is incorporated herein by reference in its entirety.

FIELD

The disclosure relates to the field of aircraft, and in particular, to fabrication and assembly of aircraft wings.

BACKGROUND

An airframe defines the mechanical structure of an aircraft. Airframes are made of multiple components that provide desired structural properties. For example, a portion of an airframe for a wing of an aircraft may include skin panels, ribs, and spars that are mechanically coupled together (e.g., via co-bonding, co-curing, or fasteners) in accordance with design parameters. As presently practiced, components of an airframe are fabricated and assembled in predefined cells on a factory floor. For example, components may be laid-up in one cell, cured in another cell, and receive post-cure prep in another cell, or otherwise fabricated at one cell, and then may be transported in their entirety to a new cell where work is performed.

While the fabrication processes discussed above are reliable, they encounter delays when work at a specific portion of a component is completed more slowly than expected. That is, the work density at the component is not at a desired level and there is too much floor space devoted to each portion of the assembly process. For example, if a particular portion of a wing takes longer than expected to be fastened or laid-up, then the entire wing assembly remains within the cell until all of the work that has been delayed is completed. Alternatively, the assembly can be advanced to a next cell, where the uncompleted assembly receives work for completing work intended for the previous cell. This in turn requires that the next cell be supplied with out of position parts, special tooling, etc. Furthermore, after a component has been moved, a great deal of time is spent cataloging the configuration of the component. This time is not value-added time. Furthermore, frequent moves between cells add a substantial amount of time that is not value-added. That is, each movement of a component between cells (and hence, each cell used in the fabrication process) requires setup time, and this setup time should be minimized to enhance efficiency. Current designs utilize automated optical inspection techniques and/or probes to inspect position of parts along six degrees of freedom across their dimensions, but these are particularly time-consuming and expensive processes.

Therefore, it would be desirable to have a method and apparatus that take into account at least some of the issues discussed above, as well as other possible issues.

SUMMARY

Embodiments described herein provide for enhanced systems and techniques that facilitate fabrication and assembly of aircraft wings via an assembly line. According to these embodiments, large components such wing panels are arranged in mirrored orientations, and are transported in pulses or moved continuously. Stations disposed at the components perform work on the components during pauses between pulses or while the component is moved continuously. This assembly technique provides a technical benefit by integrating transportation processes into assembly processes, and by reducing the amount of work to be performed on a large component each time the large component is moved.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 3 is a side view of upper wing panels receiving work at an assembly line in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The wings described herein may comprise metal parts or composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
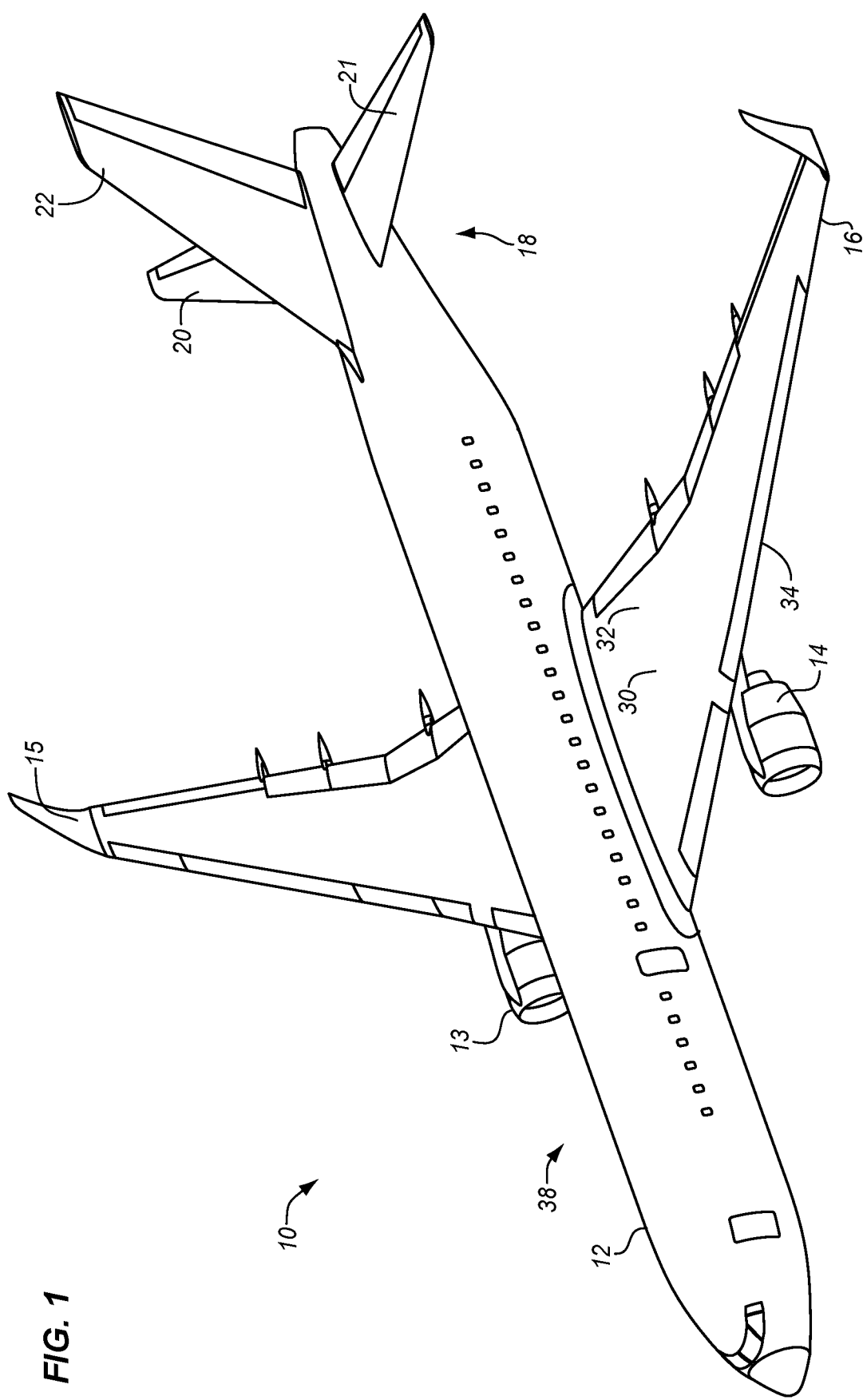
FIG. 1 is an illustration of an aircraft.

Turning now to FIG. 1, an illustration of an aircraft 10 is depicted in which an illustrative embodiment may be implemented. Aircraft 10 includes wings 15 and 16 attached to body 38. Body 38 includes fuselage 12 and tail section 18. In this example, aircraft 10 includes a first engine 13 attached to wing 15 and a second engine 14 attached to wing 16. Tail section 18 includes a horizontal stabilizer 20, a horizontal stabilizer 21, and a vertical stabilizer 22. Relevant to the current disclosure, wings 15 and 16 are formed of wing panels 30 comprising upper wing panel 32 and a lower wing panel 34 joined together as further described herein.

Figure 1A:
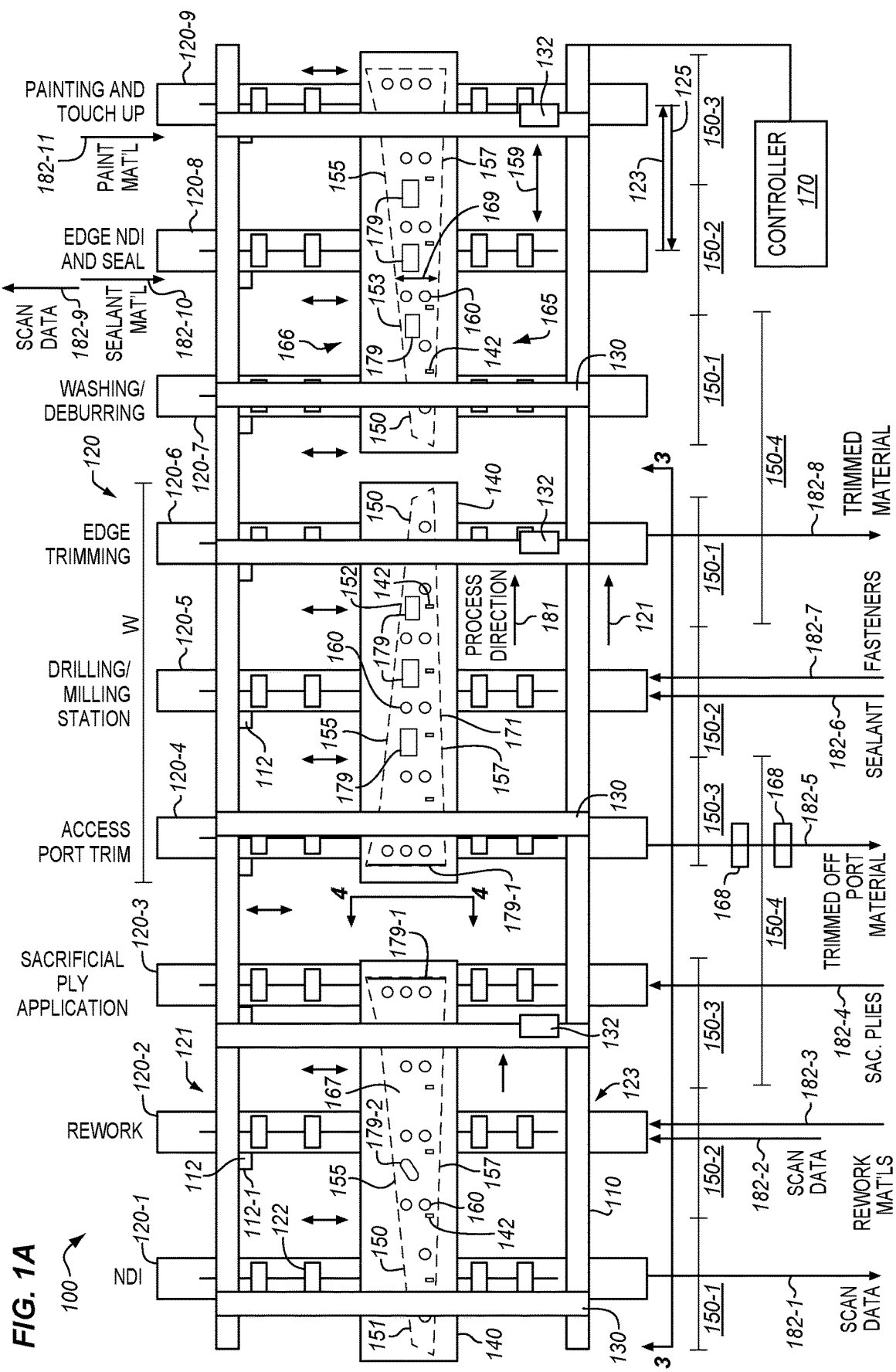
FIG. 1A is a diagram of an assembly line for multiple in-line wings in an illustrative embodiment.

FIG. 1A is a diagram of an assembly line 100 for multiple wing panels 150, with the three wing panels illustrating in the figure being labeled separately as wing panel 151, 152, and 153. Wing panels 150 are serially arranged on the assembly line 100 in an illustrative embodiment. Each wing panel 150 includes a leading edge 155 and a trailing edge 157. As illustrated, wing panels 150 are inputted into assembly line 100 with a leading edge 155 on a first side 166 of each work station 120 and a trailing edge 157 on a second side 165 of each work station 120.

Each work station 120 performs one or more different tasks upon the wing panels 150 and thus are also labeled as work stations 120-1 to 120-9. As one example of an assembly line 100 described herein, the work stations collectively referred to as work stations 120 might include: a non-destructive inspection (NDI) work station 120-1, a rework work station 120-2, a sacrificial ply application work station 120-3, an access port trim work station 120-4, a drilling/milling work station 120-5, an edge trimming work station 120-6, a washing/deburring work station 120-7, an edge NDI and sealing work station 120-8, and a painting and touch up work station 120-9. As understood by those having skill, a portion (e.g., a first side 166) of one or more specific work stations 120 are configured with tooling or other functionalities that are specific to leading edge 155 processing while the second side 165 of certain work stations 120 are configured with tooling or other functionalities that are specific to trailing edge 157 processing. When a portion of a work station is configured with tooling or other functionalities that are specific to leading edge 155 processing, the portion of the work station can be described as being dedicated to leading edge 155 processing. When a portion of a work station is configured with tool or other functionalities that are specific to trailing edge 157 processing, the portion of the work station can be described as being dedicated to trailing edge 157 processing. In some illustrative examples, for a respective workstation, the workstation has a first portion dedicated to leading edge 155 processing, and a second portion dedicated to trailing edge 157 processing. In some illustrative examples, the wing panels 150 are advanced in a process direction 181 through the number of work stations 120, at least a first portion of the work stations 120 dedicated to wing panel leading edge 155 processing, and a second portion of the work stations 120 dedicated to wing panel trailing edge 157 processing. In some illustrative examples, the first portion of the work station is on the first side 166 while the second portion of the work station is on the second side 165 of the work station. In some illustrative examples, a plurality of work stations 120 is distributed in the process direction 181 along the track 110, the work stations 120 having a first side 166 and a second side 165, a portion of the work stations 120 on the first side 166 dedicated to leading edge 155 wing panel 150 processing, a portion of the work stations 120 on the second side 165 dedicated to trailing edge 157 wing panel 150 processing. Other configurations of an assembly line 100 with a plurality of work stations 120 are contemplated to be within the scope of this disclosure, so FIG. 1A should not be construed as limiting. As used herein, "a number of" when used with reference to items means one or more items. Thus, a number of work stations 120 is one or more work stations.

The assembly line 100 exhibits an advantage over known fabrication systems because specific tooling can be located on the same side of each work station 120 for all different configurations of wing panels 150. This is significant because it is contemplated that each specific wing panel 151, 152 and 153 represents a different airplane part. For example, wing panel 152 and 153 can be construed as lower wing panels as they include access panel openings 179. As such, wing panel 151 might be construed as an upper wing panel. As known, wing panels 151, 152, and 153 are further configured as either left or right wing panels. Based on the order of the wing panels 150 moving through assembly line 100, wing panel 153 is sometimes referred to herein as first wing panel 153. Similarly, wing panel 152 is sometimes referred to as second wing panel 152, and wing panel 151 is sometimes referred to as third wing panel 151. Wing panels 150 from different aircraft models are also contemplated as being capable of processing utilizing assembly line 100.

Another advantage of this assembly line 100 is that feeder lines 182 can be located on the same side of a work station 120 station for all wing panel configurations. Feeder lines 182 include lines that go into the assembly line 100 and lines that are output by assembly line 100. In the illustrated example, NDI work station 120-1 outputs data via a scan data feeder line 182-1, rework work station 120-2 receives NDI information at a scan data feeder line 182-2 as well as rework material via a rework materials feeder line 182-3. A sacrificial ply feeder line 182-4 provides composite materials to sacrificial ply application work station 120-3. Access port trim work station 120-4 feeds trimmed material out to a trimmed off port material feeder line 182-5, while a sealant feeder line 182-6 and fasteners feeder line 182-7 provide materials to drilling/milling work station 120-5. Edge trimming work station 120-6 outputs trimmed material to a trimmed material feeder line 182-8. At edge NDI and seal work station 120-8, data is output to a scan data feeder line 182-9 while a sealant feeder line 182-10 provides sealant to edge NDI and seal work station 120-8. Finally, a paint material feeder line 182-11 provide painting material to painting and touch up work station 120-9. Again, the configuration of FIG. 1A is to be considered illustrative only, as different combinations and configurations of work stations 120 and feeder lines 182 are contemplated.

The assembly line 100 includes a track 110 that is parallel to a process direction 181. Shuttles 130 travel in the process direction 181 along the track 110 in a pulsed fashion from work station 120 to work station 120 (e.g., work stations 120-1 to 120-9), or the shuttles 130 travel continuously. The track 110 comprises one or more rails, rollers, or other elements that facilitate motion (e.g., rolling or sliding) of the shuttle 130 along the track 110. The track 110 is capable of being mounted to a floor, suspended from above, etc., depending on the specific environment in which it is used. In the illustrated embodiment, each shuttle 130 includes a motor 132 that drives the shuttle 130 along the track 110. In further embodiments, the track 110 includes a chain drive, motorized cart, powered rollers, or other powered system that is capable of moving the shuttles 130 synchronously in the process direction.

Figure 4:
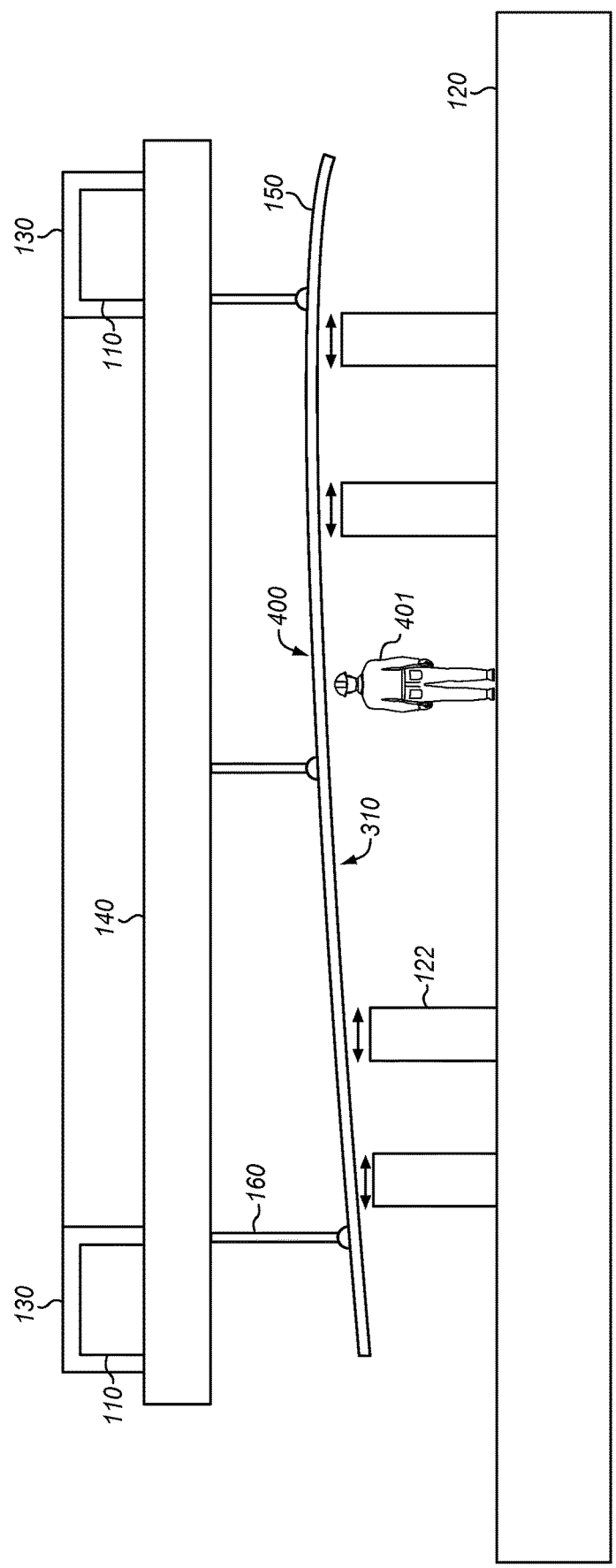
FIG. 4 is an end view of an upper wing panel being transported along an assembly line in an illustrative embodiment.

A strong back 140 associated with each shuttle 130 enforces a contour 167 onto the wing panels 150, which in one example constitutes a hardened (e.g., cured) composite part. The contour 167 is enforced utilizing pogos 160. Pogos 160 vacuum attach to the wing panels 150 at predefined locations and extend to predefined heights in order to enforce a contour 167 onto the wing panels 150 as illustrated in FIGS. 3-4. For example, an upper wing panel might have a different contour than a lower wing panel. The pogos 160 also bear forces which are transferred through the wing panels 150 while the contour 167 is enforced. In this manner, a strong back 140 suspends a wing panel 150 beneath it while enforcing a contour 167 onto the wing panel 150.

As depicted graphically in FIG. 1A, each wing panel 150 includes a wing tip section 150-1 and a wing root section 150-3. The wing tip section 150-1 comprises a contiguous section of the wing panel 150 that includes a portion closest to a wing tip, and the wing root section 150-3 comprises a contiguous section of the wing panel that includes a portion closest to a wing root (e.g., proximate to a side-of-body intersection). As depicted herein, the wing tip section 150-1 and wing root section 150-3 are separated by one or more mid length sections 150-2, and each section comprises approximately one third of a width of a wing panel 150, although the amount of space occupied by different sections may vary. In further embodiments, the wing root section 150-3 and the wing tip section 150-1 are not separated by any mid length sections 150-2. In some illustrative examples, mid length sections 150-2 can be referred to as "mid span sections".

The wing panels 150 are arranged in a widthwise series at the track 110, and the shuttles 130 advance 121 the series of wing panels 150 through the assembly line 100. As introduced above, a variety of work stations 120 (e.g., 120-1 to 120-9) perform work on the wing panels 150, and the wing panels 150 remain suspended underneath the shuttles 130 via a corresponding strong back 140. In the described embodiment, each work station 120 includes tooling (e.g., end effectors 122) and/or technicians, not shown, that move relative to a wing panel 150 and perform work such as drilling, trimming, inspecting, and/or installing components, such as access panel openings 179, sacrificial plies 179-1, rework material 179-2 or a rib 600 (shown in FIG. 6), sealant, fasteners, paint and etc. at the wing panels 150. Furthermore, in this embodiment, the wing panels 150 are arranged such that leading edges 155 of the wing panels 150 are exposed to a first side 166 of the work stations 120, and trailing edges 157 of the wing panels 150 are exposed to a second side 165 of the work stations 120.

The wing panels 150 are hardened (e.g., cured) composite parts, and thus assembly line 100 depicts a post-hardening processing technique for wing panels 150. Exemplary operations performed by the work stations 120 upon the wing panels 150 include automated Non-Destructive Inspection (NDI) (e.g., via ultrasonic or other means) via NDI work station 120-1, preparation and performance of re-work via rework work station 120-2, applying one or more sacrificial plies via manual or automated techniques at sacrificial ply application work station 120-3, and automated or manual trimming, drilling, milling, or cut-out operations via access port trim work station 120-4, drilling/milling work station 120-5, edge trimming work station 120-6, and washing/deburring work station 120-7. Additional types of work can include washing and/or deburring composite parts, performing NDI edge inspection and sealing at work station 120-8, or performing paint touch-up and curing as desired at work station 120-9.

The series of wing panels 150 are arranged in alternating orientations at the track 110, such that second wing panel 152 which is wing tip section 150-1 forward is adjacent to third wing panel 151 and first wing panel 153 which are both wing root section 150-3 forward. That is, second wing panel 152 is oriented with the wing tip section 150-1 being furthest advanced in the process direction 181, while third wing panel 151 and first wing panel 153 are oriented with a wing root section 150-3 being furthest advanced in the process direction 181. This alternating, mirrored orientation of wing panels 150 results in common work areas (illustrated graphically as common work areas 150-4) for the work stations 120. That is, the work stations 120-1 to 120-9 are able to perform work on pairs of adjacent wing root sections 150-3, in some work stations 120 simultaneously. In some illustrative examples, a first set of the work stations 120 is configured to process wing root sections 150-3 of the wing panels 150. When a work station 120 is configured to process wing root sections 150-3, the work station 120 is configured to perform wing root section 150-3 processing. The first set of the work stations 120 includes one or more work stations. In some illustrative examples, a first set of the work stations 120 configured to process wing root sections 150-3 of the wing panels 150, the first set of work stations 120 further operable to process wing root sections 150-3 of two wing panels 150 simultaneously, when the wing root sections 150-3 are disposed adjacent to one another along the track 110. In some illustrative examples, a second set of the work stations 120 is configured to process wing tip sections 150-1 of the wing panels 150. When a work station 120 is configured to process wing tip sections 150-1, the work station 120 is configured to perform wing tip section 150-1 processing. The second set of the work stations 120 includes one or more work stations. In some illustrative examples, a second portion of the work stations 120 is operable to process wing tip sections 150-1 of the wing panels 150, the second set of work stations 120 further operable to process wing tip sections 150-1 of two wing panels 150 simultaneously, when wing tip sections 150-1 are disposed adjacent to one another along the track 110. As depicted in FIG. 1A, work stations 120-1 to 120-9 comprises a first set of work stations, work stations 120-3 and 120-4 configured to perform processing on wing root sections 150-3, and a second set of work stations, work stations 120-6 and 120-7 configured to perform processing on wing tip sections 150-1. As the wing panels 150 progress through work stations 120-1 to 120-9, the work stations in the first set of work stations and the work stations in the second set of work stations can change as the wing panels 150 travel in process direction 181.

After inputting wing panels 150 into the assembly line 100 such that the wing root sections 150-3 are adjacent, at least one work station 120 configured to perform wing root section 150-3 processing is operated. In some illustrative examples, operating the at least one work station 120 that is configured to perform wing root 150-3 processing comprises processing wing root sections 150-3 of two adjacent wing panels 150 simultaneously. Later those same work stations 120-1 to 120-9 can later perform work on two adjacent wing tip sections 150-1. After inputting wing panels 150 into the assembly line 100 such that the wing tip sections 150-1 are adjacent, at least one work station 120 configured to perform wing tip section 150-1 processing is operated. In some illustrative examples, operating the at least one work station 120 that is configured to perform wing tip 150-1 processing comprises processing wing tip sections 150-1 of two adjacent wing panels 150 simultaneously. In environments where the work stations 120-1 to 120-9 are configured to perform different types of operations on different sections of wing panels 150, work stations 120-1 to 120-9 are configured to apply their specific work components to different sections of wing panels 150. In some illustrative examples, a work station 120 can perform a similar type of work upon an entirety of the common work area 150-4 of FIG. 1A (e.g., spanning multiple ones of wing tip sections 150-1 of different wing panels), before shifting modes of operation to accommodate a different work area (e.g., spanning multiple wing root sections 150-3 of different wing panels 150). When the work station 120 is configured to perform wing tip section 150-1 processing, the work station has a mode of operation to accommodate a common work area 150-4 of multiple wing tip sections 150-1. When the work station 120 is configured to perform wing root section 150-3 processing, the work station has a mode of operation to accommodate a common work area 150-4 of multiple wing root sections 150-3.

Multiple ones of the work stations 120-1 to 120-9 can work on the same wing panel 150 during the same pause between pulses or during continuous advancement of the wing panel 150 as wing panels 150 are of a length that extends across multiple work stations 120. In embodiments where the wing panels 150 advance 121 continuously, the work stations 120-1 to 120-9 track, for example, first wing panel 153 advancing through a work range 123 and then perform a carriage return 125 to a start point for receiving the second wing panel 152 when the first wing panel 153 exits the work range 123. Alternatively the carriage return might be executed for receiving the next section (e.g., wing tip section 150-1, mid length section 150-2, wing root section 150-3) of the same wing panel 150. FIG. 1A shows only the work range 123 and carriage return 125 for work station 120-8, but similarly each work station 120-1 to 120-7 and 120-9 also has a work range 123 and carriage return 125.

This arrangement also results in longer periods of time before operations are changed at a work station 120, which provides a longer window of time for materials to be delivered to or removed from the work stations 120 (e.g., rework work station 120-2 which performs rework, or sacrificial ply application work stations 120-3 which applies sacrificial plies such as CFRP or fiberglass plies, and may perform layup), and for maintenance to be performed on the work stations 120-1 to 120-9, such as cleaning, replacing blades, tuning up or etc.

For example, a rework work station 120-2 performs rework on a wing tip section 150-1, but is not needed to perform rework on the next wing tip section 150-1 in series. This gives rework work station 120-2, a break equal to the transition time for second wing tip section 150-1. During a break, retooling materials such as new blades can be installed into the edge trimming work station 120-6, while it receives additional maintenance. Thus, the techniques described herein provide a greater work density by enhancing efficiency and throughput, while reducing floor space for the amount of work associated with work stations 120.

Work stations 120 are distributed in the process direction 181 along the track 110 and perform work on wing panels 150. Multiple of work stations 120 may operate at the same time to perform work on the same wing panel 150 during the same pause between pulses, and/or synchronously with each other to perform different tasks at different sections of a wing panel 150 (e.g., the wing tip section 150-1, mid length section 150-2, wing root section 150-3, etc.). In this embodiment, the work stations 120 include a Non-Destructive Inspection (NDI) work station 120-1 that inspects the wing panels 150 for out-of-tolerance conditions (e.g., internal voids, debris, etc.), a rework work station 120-2 that performs rework to address out of tolerance conditions, and a sacrificial ply application work station 120-3. Further work stations include an access port trim work station 120-4 that creates an access panel opening 179 by trimming of manufacturing excess 168 in the first wing panel 153 and the second wing panel 152 (both illustrated in FIG. 1A as lower wing panels), a drilling/milling work station 120-5 that installs ribs 600 and/or spars 640, shown in FIG. 6, an additional station (not shown) devoted to rib installation onto wing panels 150 and located downstream of drilling/milling work station 120-5, a spar install station (not shown) that installs spars to the wing panels 150 and located downstream from drilling/milling work station 120-5. Additional stations comprise, an edge trimming work station 120-6, a washing/deburring work station 120-7, an edge NDI and work station 120-8, and a painting and touch up work station 120-9.

In one embodiment, the rib 600 and spar 640 installation process involves parallel rib 600 and spar 640 fabrication techniques that provide ribs and spar segments in a just-in-time manner from parallel feeder lines 182 to the rib and spar installation station. In a non-illustrated embodiment, the work stations 120 include a panel join work station that attaches corresponding wing panels 150 together (e.g., an upper right wing panel and a lower right wing panel) to form a completed wing, not shown. In one embodiment, the panel join station operates alone as a full pulse such as by itself on the entirety of the wing (e.g., wing 15 or wing 16) without advancing 121 until joining is completed. In further embodiments stations are included for installing access panels (not shown) and doors (not shown) into cutout regions (e.g., access panel openings 179) of a wing panel 150 or access panel and door installation also occurs in drilling/milling work station 120-5. The work stations 120 are disposed along the track 110 that transports the wing panels 150 and may be separated by less than the span of wing tip section 150-1, mid length section 150-2 or wing root section 150-3. Such an arrangement enables multiple work stations 120 to perform work on a single one of the wing panels 150 at the same time or during the same pause between pulses. For instance, an edge trimming work station 120-6, a washing/deburring work station 120-7, an edge NDI and work station 120-8 work upon wing tip section 150-1, mid length section 150-2 and wing root section 150-3, respectively. In further embodiments, work performed at the work stations 120 can be automated, manual, or manually assisted or performed manually.

As briefly described above, feeder lines 182-2 through 182-4, 182-6 and 182-7, 182-10, and 182-11 provide various needed materials to the work stations 120-1 through 120-9. In this embodiment, outflow line, scan data feeder line 182-1, receives scan data from a work station 120-1 that performs NDI, and outflow line, scan data feeder line 182-9, receives scan data from another work station 120-8 that performs NDI. Rework materials feeder line 182-3 provides rework materials, for example, resin and fiber reinforced materials to rework work station 120-2 which performs rework. Scan data feeder line 182-2 provides scan data to the rework work station 120-2. Sacrificial ply feeder line 182-4 provides sacrificial plies like fiberglass or CFRP plies of material to sacrificial ply application work station 120-3 for placement onto the wing panel 150, wing panel 151, 152, and 153. Outflow line, trimmed off port material feeder line 182-5, removes trimmed off manufacturing excess 168 from access port trim work station 120-4. Sealant feeder lines 182-6 and fasteners feeder line 182-7 provide sealant and fasteners, respectively, to drilling/milling work station 120-5 which performs drilling and/or milling. Furthermore, outflow line, trimmed material feeder line 182-8 removes trimmed edge manufacturing excess 171 material that has been cut by edge trimming work station 120-6. Sealant feeder line 182-10 provides sealant material to work station 120-8, and paint material feeder line 182-11 provides paint material to work station 120-9, which performs painting.

In one embodiment, the wing panels 150 are pulsed by less than their span, that span comprising wing tip section 150-1 plus mid length section 150-2 plus wing root section 150-3, and multiple work stations 120-1 to 120-9 perform work on the wing panels 150 during pauses between pulses. This is referred to herein as "micro pulse" fabrication. In further embodiments, the work stations are separated by a distance of equal to or greater than the span of the wing panels 150 and one station performs work on the entirety of the wing panel 150 at a time. This technique is referred to herein as "full pulse" fabrication. In still further embodiments, the wing panels 150 proceed continuously along the track 110, and the work stations 120 perform work on the wing panels 150 during the continuous motion.

In one embodiment, an upper wing panel is followed by a lower wing panel. The lower wing panel does not receive ribs 600 or spars 640 (i.e., because these components are already installed to the upper wing panel). Cut-out stations (e.g., access port trim work station 120-4) performs a majority of the work on the wing panels 150 that are lower wing panels, because access panel openings 179 are generally located on lower wing panels, while a majority of work on the wing panels 150 that are upper wing panels comprises installing ribs 600 and spars 640. In further embodiments, a fastener sealing station (e.g., drilling/milling work station 120-5) is utilized to seal the fasteners installed on the wing panel 150, and various work stations 120 are also utilized for installing electrical components (not shown), electrical equipment (not shown), and/or fuel tank related systems (not shown). In further embodiments, the wing panels 150 are components for different models of aircraft, comprise left (upper and lower) wing panels and right (upper and lower) wing panels.

Each shuttle 130 indexes to an indexing unit 112 having a hard stop 112-1 disposed at a known offset to each work station 120. In some embodiments, the indexing is performed via physical means, such as via complementary groove-and-slot geometries, cup-and-cone geometries (not shown), a hard stop 112-1, etc. In further embodiments, the indexing is performed via visual means, Radio Frequency Identification (RFID) technology, or some combination of the above-recited techniques. In this manner, the indexing units 112 are disposed along the track 110 for the purpose of indexing the wing panels 150 to the work stations 120.

In still further embodiments, each indexing unit 112 in the assembly line 100 is designed to physically couple, to image, or to otherwise interact with an indexing feature 142 in a wing panel 150, or with a strong back 140 that is itself physically coupled with an indexing feature 142. The indexing features 142 are formed or otherwise placed at known locations along the wing panel 150, and in one embodiment each of the indexing features 142 is separated by the same distance along the wing panel 150. The indexing features 142 are each placed so as to be accessible to the indexing units 112 of one or more work stations 120. In one embodiment, the indexing features 142 are disposed in a trimmed edge manufacturing excess 171 of the wing panel 150, which is trimmed away in edge trimming work station 120-6.

In one embodiment, each of the work stations 120 in the assembly line 100 inserts into, grasps, fits, or aligns to an indexing feature 142. In further embodiments, the shuttle 130 itself physically couples with the indexing features 142, and hard stops 112-1 or other features at the work stations 120 are used to index the shuttle 130 to the work stations. During assembly, the shuttle 130 is pulsed (e.g., a distance at least equal to the shortest distance between indexing features 142, a pitch distance (not shown) between ribs 600 ("rib pitch"), or a fraction or multiple of rib pitch or is continuously moved, and is indexed to the work stations 120. Work is then performed by the various work stations 120. Whenever the indexing features 142 and the shuttle 130 are mated, the shuttle 130 is indexed to the work stations 120. Thus, the location of the wing panel 150 is indexed to a known location in a coordinate space shared by the track 110 and the work stations 120.

In one embodiment, indexing is performed at least according to the following description. A wing panel 150 is carried upon a shuttle 130 that moves along a track 110 comprising a rail system embedded within the floor, bolted to the floor disposed above the floor, glued to the floor, set down upon the floor, etc. The rails (not shown) are positioned in predefined locations that are determined during design of the assembly line 100. The wing panel 150 is indexed to the shuttle 130 via indexing features 142, and suspended under the shuttle 130. When the shuttle 130 is advanced 121 to an individual work station 120, it indexes to an indexing unit 112. Thus, the 3D position and rotation of the wing panel 150 is precisely known, including the contours 167 imposed by the pogos 160. This is achieved without the need for a full scan via probes or optical technology at each work station 120, because the wing panel 150 is indexed to the shuttle 130 and the shuttle 130 is indexed to the work station 120. Thus, the contour 167 (outer mold line (OML) and inner mold line (EVIL) loft characteristics) of the wing panel 150 at the individual work stations 120 is known at the work station 120 after each pulse.

Because of the precise indexing performed, and the order of wing panel 150 insertion into assembly line 100, end effectors/tools at each work station are able to know exactly where they are relative to the wing panel 150, whether the wing panel 150 is an upper/lower/left/right wing panel 150, the contours 167 of the wing panel 150, and when the wing panel 150 is locked into place. Because of the precise indexing performed, technicians at each work station are able to know exactly where they are relative to the wing panel 150 when the wing panel 150 is locked into place. The 3D position and orientation, of the wing panel 150 is then established or indexed into any Numerical Control (NC) programming or automated system in use at the work station 120. Therefore, no setup time or scanning is needed after each pulse of the wing panel 150. Furthermore, structure added to or removed from the wing panel 150 in the prior work station 120 may be added to the wing panel 150 model or representation within the system, without the need to scan the wing panel 150 for changes.

The operations of the work stations 120 are managed by a controller 170. In one embodiment, controller 170 determines a progress of the shuttle 130 along the track 110, and uses this input to manage the operations of the work stations 120 in accordance with instructions stored in an NC program. Controller 170 may be implemented, for example, as custom circuitry, as a hardware processor executing programmed instructions, or some combination thereof.

Figure 1B:
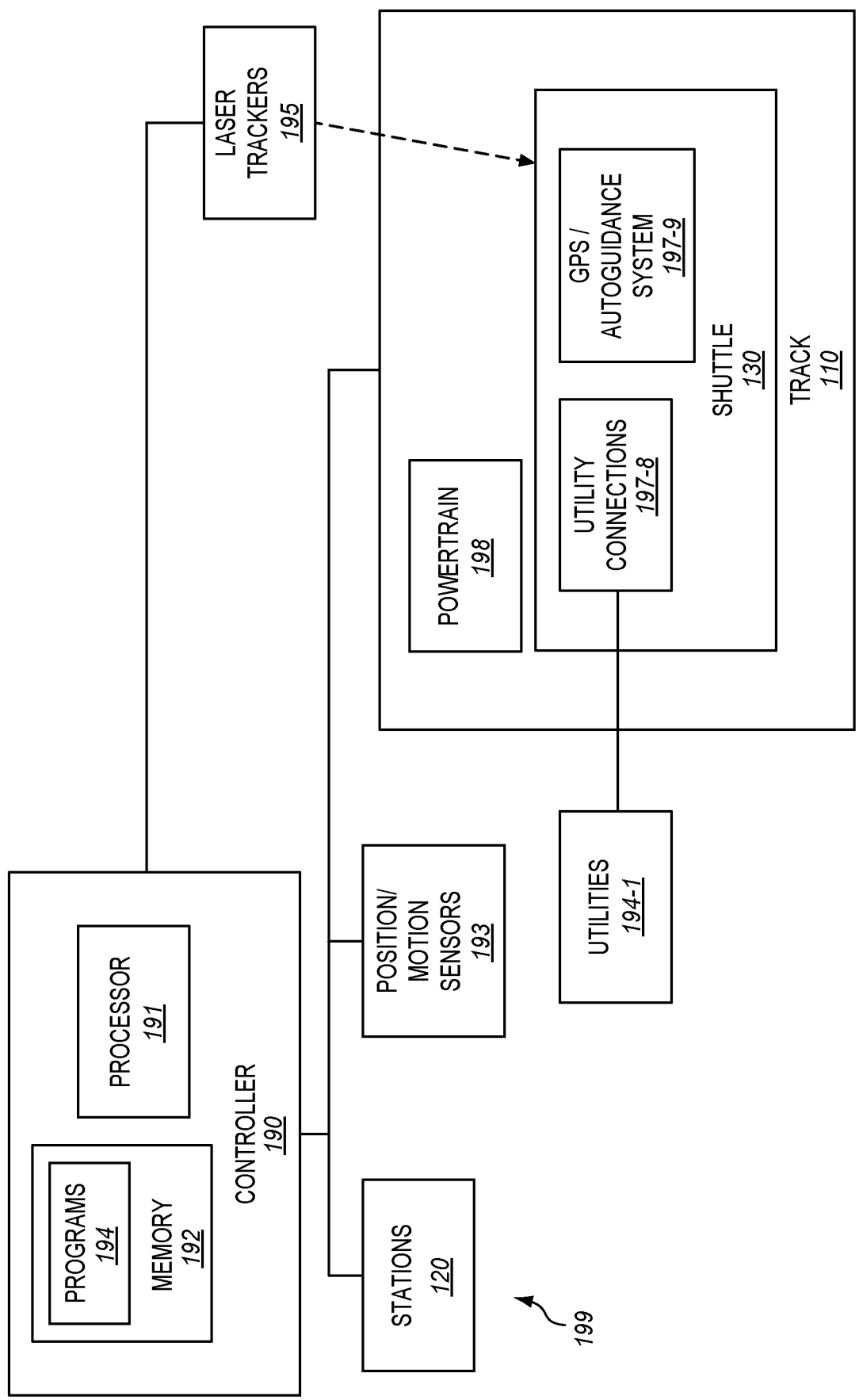
FIG. 1B broadly illustrates control components of a production system in an illustrative embodiment.

Attention is now directed to FIG. 1B, which broadly illustrates a production system for composite parts in an illustrative embodiment. A controller 190 coordinates and controls operation of stations 120 and movement of one or more shuttles 130 along a track 110 having a powertrain 198 (e.g., a motor 132 of FIG. 1A). The controller 190 may comprise a processor 191 which is coupled with a memory 192 that stores programs 194. In one example, the shuttles 130 are driven along a moving line 199 that is driven continuously by the powertrain 198 (e.g., motors 132 of FIG. 1A), which is controlled by the controller 190. In this example, the shuttle 130 (also shown in FIG. 1A) includes utility connections 197-8 which may include electrical, pneumatic and/or hydraulic quick disconnects that couple the shuttle 130 with externally sourced utilities 194-1. In other examples, the shuttles 130 comprise Automated Guided Vehicles (AGVs) that include on board utilities, as well as a global positioning system (GPS)/autoguidance system 197-9. In still further examples, the movement of the shuttles 130 is controlled using laser trackers 195. Position and/or motion sensors 193 coupled with the controller 190 are used to determine the position of the shuttles 130 as well as the powertrain 198.

Figure 1C:
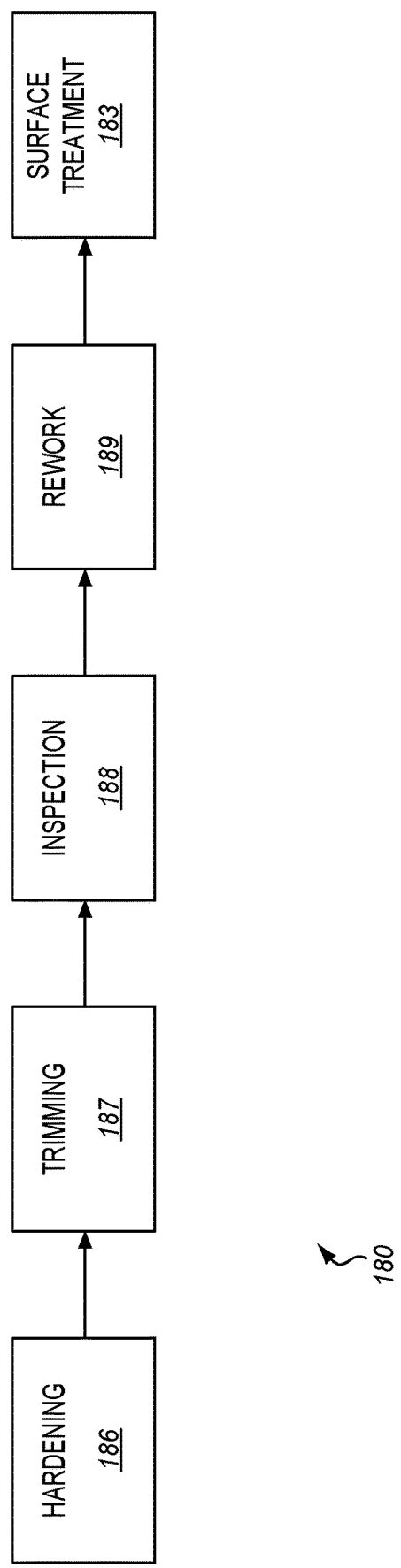
FIG. 1C depicts a flow diagram for fabrication of composite parts in an illustrative embodiment.

FIG. 1C depicts a flow diagram 180 for fabrication of composite parts in an illustrative embodiment. As depicted in FIG. 1C, processes for fabrication include hardening 186 to form a composite part, after which the composite part travels to a new location to receive trimming 187 (e.g., of a manufacturing excess 168 (shown in FIG. 1A)), inspection 188 (e.g., via non-destructive means), rework 189, and surface treatment 183. The rework 189 follows inspection 188.

Illustrative details of the operation of assembly line 100 will be discussed with regard to FIGS. 2A and 2B. Assume, for this embodiment, that wing panels 150 have been affixed to strong backs 140, and that shuttles 130 carrying the strong backs 140 are placed onto the assembly line 100. That is, the wing panels 150 are suspended at the assembly line 100 via strong backs 140 that enforce contours 167 onto the wing panels 150.

Figure 2A:
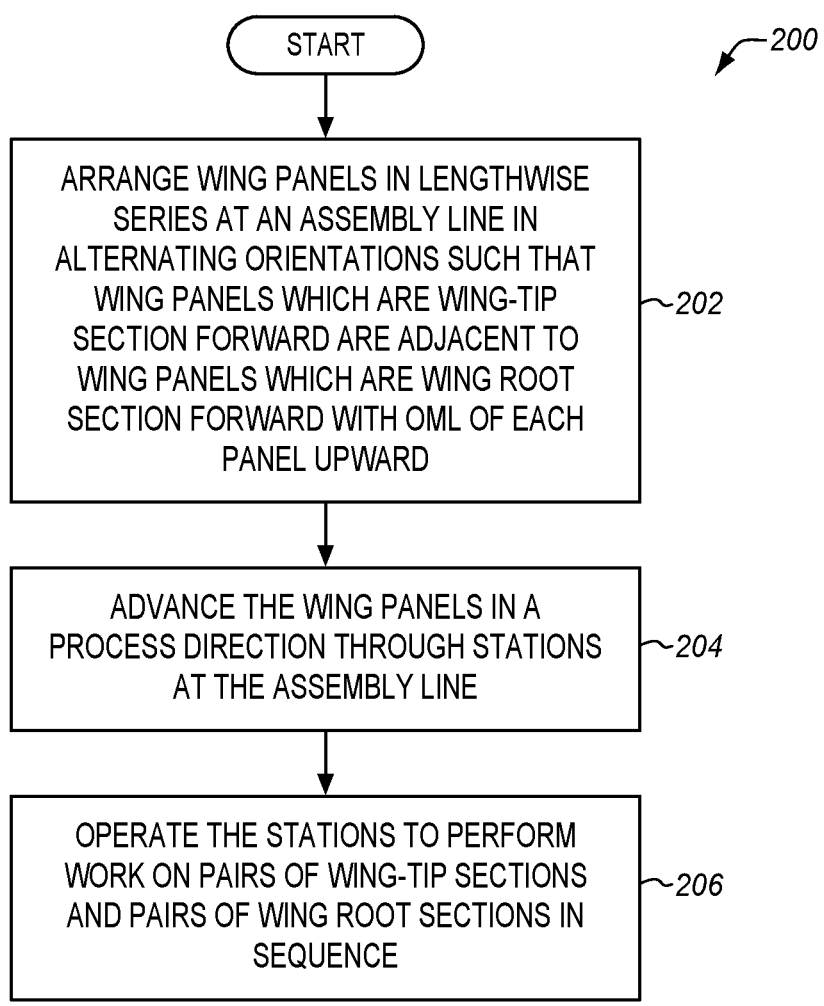
FIGS. 2A-2B are flowcharts illustrating methods of fabricating wings via an assembly line in an illustrative embodiment.

FIG. 2A is a flowchart illustrating a method 200 of processing wing panels and fabricating wings via an assembly line 100 in an illustrative embodiment. The steps of method 200 are described with reference to assembly line 100 of FIG. 1A, but those skilled in the art will appreciate that method 200 may be performed in other systems. The steps of the flowcharts described herein are not all inclusive and may include other steps not shown. The steps described herein may also be performed in an alternative order.

In step 202, wing panels 150 are arranged in a lengthwise series at an assembly line 100 in alternating orientations such that wing panels 150 which are wing-tip section 150-1 forward are adjacent to wing panels which are wing root section 150-3 forward with OML of each panel upward. In some illustrative examples, in step 202, wing panels 150 are arranged in spanwise 159 series at the assembly line 100 in alternating orientations such that a wing panel 150, which is wing tip section 150-1 forward, is adjacently in series with wing panel 150 having wing root section 150-3 forward. That is, the wing panels 150 are alternatingly oriented to proceed in the process direction 181 from root to tip, and from tip to root with OML of each wing panel 150 upward. This results in common work areas 150-4 that span multiple wing panels 150. The expanded common work areas 150-4 promote less change of tooling and personnel as wing panels 150 progress through work stations 120. The spanwise 159 wing panel 150 orientation facilitates rib 600 installation as ribs 600 are installed chordwise 169 and could be installed in one work station 120 and possibly in one pause between pulses or in a continuous process. The ribs 600 are installed at a rib pitch or spacing which promotes micro pulsing the wing panels 150 at rib pitch spacing or a multiple or fraction thereof.

The tip to root arrangement facilitates locating the leading edge 155 always on one side of the work station 120 and the trailing edge 157 of the wing panels 150 always on the other side of the work station 120. Each wing panel 150 has leading edge 155 on first side 166 of each work station 120. Each wing panel 150 has trailing edge 157 on second side 165 of each work stations 120. The advantage of this type of arrangement is that the tooling and jigs needed for trailing edge 157 assembly are always on the second side 165 while the tooling and jigs needed for the leading edge 155 are always on the first side 166, thus increasing efficiency. This is an example of bringing the work to the tooling and technicians instead of bringing the tooling and technicians, and thus work, to the appropriate portion of the wing panel 150. In further embodiments, wing panels 150 for different models of aircraft succeed each other in series down the assembly line 100.

In step 204, the wing panels 150 are advanced 121 in the process direction 181 through the work stations 120 at the assembly line 100. In one embodiment, this step includes operating motors 132 at the shuttles 130 to drive the shuttles 130 in the process direction 181. In a further embodiment, this step comprises operating a chain drive at the track 110 that advances 121 all shuttles 130 synchronously.

Step 206 includes operating the work stations to perform work on pairs of wing tip sections 150-1 and pairs of wing root sections 150-3 in sequence. That is, each work station 120 performs work on a wing tip section 150-1 of a first wing panel 153, followed immediately by a wing tip section 150-1 of second wing panel 152, and each work station 120 performs work on a wing root section 150-3 of the second wing panel 152, followed by a wing root section 150-3 of a third wing panel 151. That is, each work station 120 can perform a similar type of work upon an entirety of the common work area 150-4 of FIG. 1A (e.g., spanning multiple ones of wing tip sections 150-1 of different wing panels), before shifting modes of operation to accommodate a different work area (e.g., spanning multiple wing root sections 150-3 of different wing panels 150).

Furthermore, the leading edges 155 and trailing edges 157 of the series of wing panels 150 are arranged such that leading edges 155 consistently occupy first side 166 of the assembly line 100, while trailing edges 157 consistently occupy the second side 165 side of the assembly line 100. Therefore, one side of a work station 120 always works on the leading edge 155 of each wing panel 150, while another side of the work station 120 always works on a trailing edge 157 of each wing panel 150. Operations proceed similarly for additional wing panels 150, alternating between pairs of wing tip sections 150-1 and pairs of wing root sections 150-3, wherein pairs of wing tip sections 150-1 and pairs of wing root sections 150-3 may be separated by one or more mid length sections 150-2.

In one embodiment, the wing panels 150 proceed in a micro-pulse fashion as described above, wherein the wing panels 150 synchronously advance 121 by less than their span, and then each pause to receive work at one of more work stations 120. In a further full pulse embodiment, the wing panels 150 are pulsed by their entire span, comprises wing tip section 150-1 plus mid length section 150-2 plus wing root section 150-3, and are then paused to receive work at multiple work stations 120. In either case, the wing panels 150 are pulsed in the process direction 181, and the work stations 120 perform work on the wing panels 150 during pauses between pulses. In a still further embodiment, the wing panels 150 are advanced 121 continuously in the process direction 181, and the work stations 120 perform work on the wing panels 150 during the continuous motion.

In any of the above cases, the method 200 may further include performing different operations/work on wing tip sections 150-1 than wing root sections 150-3 for at least one of the work stations 120, and/or applying different components to wing tip sections 150-1 than wing root sections 150-3 for at least one of the work stations. This different work may comprise installing different numbers or types of fasteners, installing different numbers or types of components, etc.

Method 200 provides a technical benefit over prior techniques, because it enables wing panels 150 for aircraft 10 to be fabricated in a manner that places common sections in sequence for work. This enhances throughput and reduces the amount of labor and time associated with switching modes of operation of work stations 120. Further benefits are achieved because the leading edge 155 are placed at a first side 166 of the work stations 120, and the trailing edge 157 are placed at second side 165 of the work stations 120. Thus, tooling and personnel used on a leading edge 155 of the wing panel 150 do not have to be shifted from first side 166 of the work station to the second side 165 and vice versa.

Figure 2B:
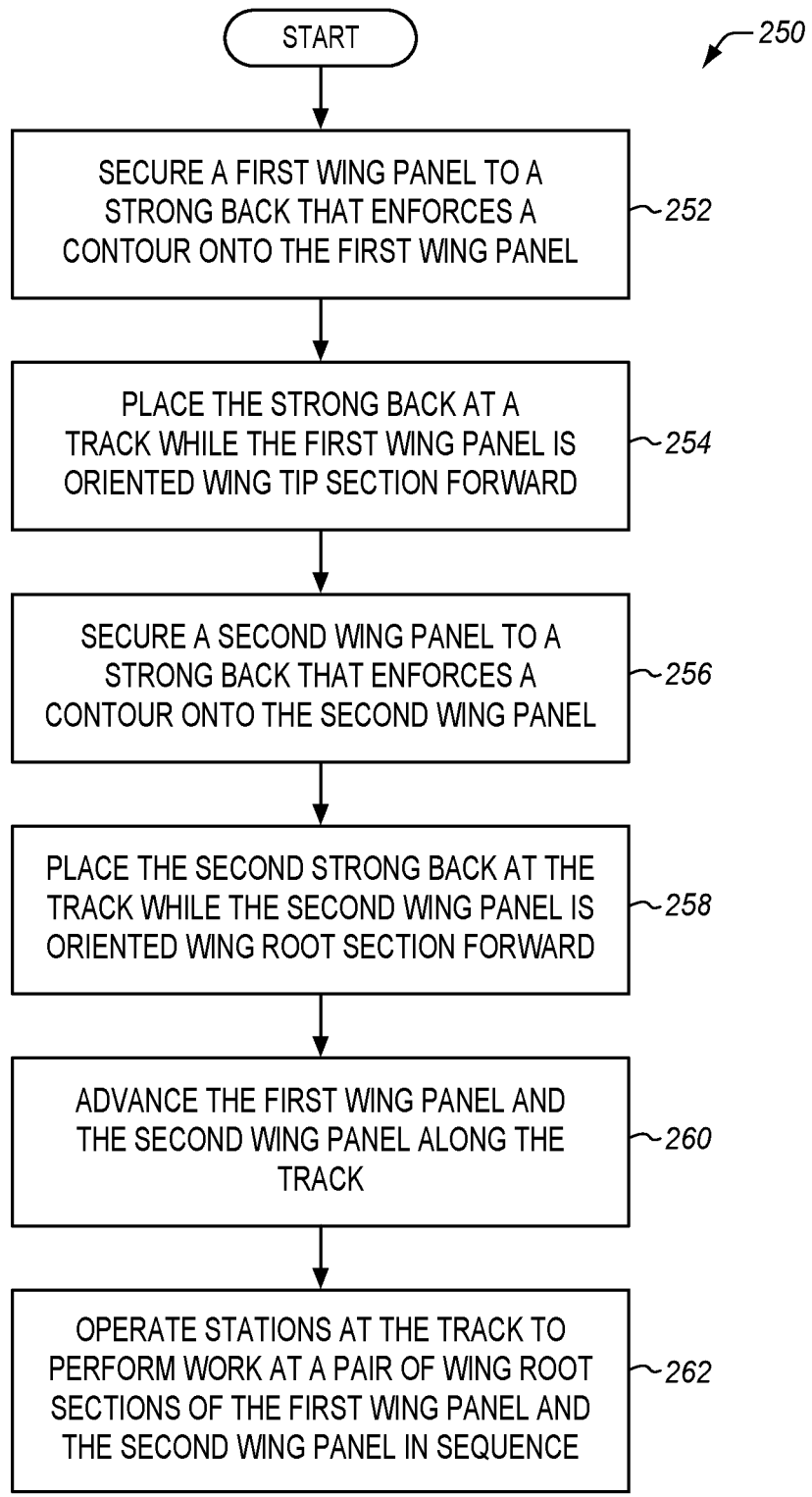

FIG. 2B is a flowchart illustrating a further method 250 of fabricating wings 15, 16 via an assembly line 100 in an illustrative embodiment. Step 252 of method 250 includes securing a first wing panel 153 to a first strong back 140 that enforces a contour 167 onto the first wing panel 153. In one embodiment this is performed by indexing a strong back 140 to indexing features 142 at the first wing panel 153, and applying multiple ones of pogos 160 to the first wing panel 153 at desired heights and locations in order to apply a vacuum grip that enforces a contour 167 onto the first wing panel 153.

Step 254 includes placing the first strong back 140 at a track 110 while the first wing panel 153 is oriented wing tip section 150-1 forward. That is, the strong back 140 is loaded onto a shuttle 130 at the track 110, or a shuttle 130 carrying the strong back 140 is loaded onto the track 110 to enable process direction 181 of the wing panel 150 through the assembly line 100. In some illustrative examples, Step 254 includes placing the first strong back 140 at a track 110 while the first wing panel 153 is oriented wing root section 150-3 forward.

Step 256 comprises securing a second wing panel 152 to a second strong back 140 that enforces a contour 167 onto the second wing panel 152, and is performed in a similar manner to step 252 above.

Step 258 comprises placing the strong back 140 at the track 110 while the second wing panel 152 is oriented wing root section 150-3 forward, and is performed in a similar manner to step 254 above, with the exception that the second wing panel 152 is oriented in a mirrored orientation to that of the first wing panel 153. In some illustrative examples, when step 254 includes placing the first strong back 140 at a track 110 while the first wing panel 153 is oriented wing root section 150-3 forward, step 258 includes placing the strong back 140 at the track 110 while the second wing panel 152 is oriented wing tip section 150-1 forward Step 260 comprises advancing the each strong back 140 along the track 110. In one embodiment, this is performed in the same manner as step 204 of method 200. As the wing panels 150 advance (or during pauses between pulses), the work stations 120 perform work on the wing panels 150. From the perspective of the work stations 120, a wing root section 150-3 of the first wing panel 153 is received, followed by the wing tip section 150-1 of the first wing panel 153, followed by the wing tip section 150-1 of the second wing panel 152, followed by the wing root section 150-3 of the second wing panel 152, and in a similar alternating fashion for additional wing panels 150 arranged in a spanwise series. The advancing process may be performed in micro-pulse, full pulse, or continuous fashion as discussed above.

Step 262 comprises operating work stations 120 at the track 110 to perform work at a pair of wing root sections 150-3 of the first wing panel 153 and the second wing panel 152 in sequence. That is, the work stations 120 perform work on a pair of wing root sections 150-3 such as a first instance of a wing root section 150-3 of the first wing panel 153, and a second instance of a wing root section 150-3 of a second wing panel 152. With regard to second wing panel 152, any intervening ones of mid length sections 150-2 follow wing root section 150-3 and followed by a pair of wing tip sections 150-1 as shown by the second wing panel 152 and the third wing panel 151. Any intervening ones of mid length sections 150-2, follow and are followed by a pair of wing root sections 150-3, etc. This means that wing root sections 150-3 at adjacent wing panels 150 form a common work area 150-4, as do wing tip section 150-1 at adjacent wing panels 150. Hence, work stations 120-1 to 120-9 can perform a wing root section 150-3 mode of operation for multiple wing root sections 150-3 before switching modes of operation to a mid length section 150-2 or wing tip section 150-1 mode of operation. In some illustrative examples, step 262 comprises operating work stations 120 at the track 110 to perform work at a pair of wing tip sections 150-1 of the first wing panel 153 and the second wing panel 152 in sequence. That is, the work stations 120 perform work on a pair of wing tip sections 150-1 such as a first instance of a wing tip section 150-1 of the first wing panel 153, and a second instance of a wing tip section 150-1 of a second wing panel 152. With regard to second wing panel 152, any intervening ones of mid length sections 150-2 follow wing tip section 150-1 and followed by a pair of wing root sections 150-3 as shown by the second wing panel 152 and the third wing panel 151. Any intervening ones of mid length sections 150-2, follow and are followed by a pair of wing root sections 150-3, etc. This means that wing root sections 150-3 at adjacent wing panels 150 form a common work area 150-4, as do wing tip section 150-1 at adjacent wing panels 150. Hence, work stations 120-1 to 120-9 can perform a wing tip section 150-1 mode of operation for multiple wing tip sections 150-1 before switching modes of operation to a mid length section 150-2 or wing root section 150-3 mode of operation. As used herein, a common work area 150-4 span a pair of sections of a wing panel 150 that represent the same portion of the wing panel 150 but are mirrored in orientation. That is, a common work area 150-4 may comprise a pair of wing tip sections 150-1, a pair of wing root sections 150-3, etc.

Processing further continues iteratively by securing a third wing panel 151 to a strong back 140 that enforces a contour 167 onto the third wing panel 151, placing the strong back 140 at the track 110 while the third wing panel 151 is oriented wing root section 150-3 forward, advancing the strong back 140 with the first wing panel 153 and strong back 140 with the second wing panel 152 and the strong back 140 with the third wing panel 151 along the track 110, and operating work stations 120 at the track 110 to perform work at a pair of wing root sections 150-3 of the second wing panel 152 and the third wing panel 151 in sequence. Such operations are performed for additional wing panels 150 in the widthwise series on an ongoing basis.

While the arrangement of wing panels discussed above describes a first wing panel 153 being arranged such that a wing root section 150-3 is forward, in further embodiments the first wing panel 153 is wing tip section 150-1 forward, and the third wing panel 151 is wing tip section 150-1 forward. Furthermore, the wing panels can be arranged to have leading edge 155 and trailing edge 157 always on the same side of a work station 120, namely second side 165 and first side 166, respectively. Method 250 provides a technical benefit over prior techniques in a similar manner to method 200 described above.

FIG. 3 is a spanwise view of wing panels 150, specifically third wing panel 151 and second wing panel 152, receiving work at an assembly line 100 in an illustrative embodiment, and corresponds with view arrows 3 of FIG. 1A. As shown in FIG. 3, shuttles 130 advance along a track 110 in a process direction- and include strong backs 140. Strong backs 140 include pogos 160, which include shafts 322 that have an adjustable-length. The pogos 160 further include vacuum connectors 324. By setting a length of each shaft 322, and applying a vacuum grip to third wing panel 151 and second wing panel 152 via the vacuum connectors 324, a contour 167 is enforced onto third wing panel 151 and second wing panel 152. It should be noted again that the contour 167 could be different depending on whether the wing panel 150 is an upper or lower wing panel. Work stations 120 perform work on the third wing panel 151 and second wing panel 152, and in this embodiment operate end effectors 122. Alternatively or additionally, manual work is performed within channels that are disposed beneath a lower surface 310 of the third wing panel 151 and second wing panel 152. In this configuration safety measures are enforced such that human workers and end effectors (i.e., robots) do not interfere with one another. The third wing panel 151 and second wing panel 152 are arranged such that wing root sections 150-3 and wing tip sections 150-1 are adjacent to neighboring ones of wing panels 150, resulting in common work areas 150-4 that span pairs of wing root sections 150-3 and wing tip sections 150-1. Furthermore, time is saved because there is no need to move tooling (e.g., tooling within stations 120) designed specifically for leading edge 155 and trailing edge 157 from second side 165 of a work station 120 to the first side 166 of the work station 120 when a subsequent wing panel 150 in series enters the work station 120.

In further embodiments, the pogos 160 and vacuum connectors 324 are placed relative to the third wing panel 151 and second wing panel 152 to allow access to specific locations on third wing panel 151 and second wing panel 152 for assembly purposes. That is, the placement of the pogos 160 and the vacuum connectors 324 enables access to rib and/or spar land 311 on a localized basis and provide enough clearance to facilitate assembly of the part being joined at the rib and/or spar land 311 including ribs or spars, not shown. The pogos 160 and vacuum connectors 324 can further be temporarily removed to gain better access to rib and/or spar land 311 on third wing panel 151 and second wing panel 152 during assembly within a particular work station 120.

FIG. 4 is an end view 400 of a wing panel 150 being transported along an assembly line 100 in an illustrative embodiment, and corresponds with view arrows 4 of FIG. 1A. FIG. 4 illustrates a contour 167 enforced onto a wing panel 150 and further illustrates end effectors 122 of a work station 120, which are capable of moving as desired to perform work upon different portions of the wing panel 150. Technicians 401 assigned a work station 120 are capable of moving as desired to perform work upon different portions of the wing panel 150.

Figure 5:
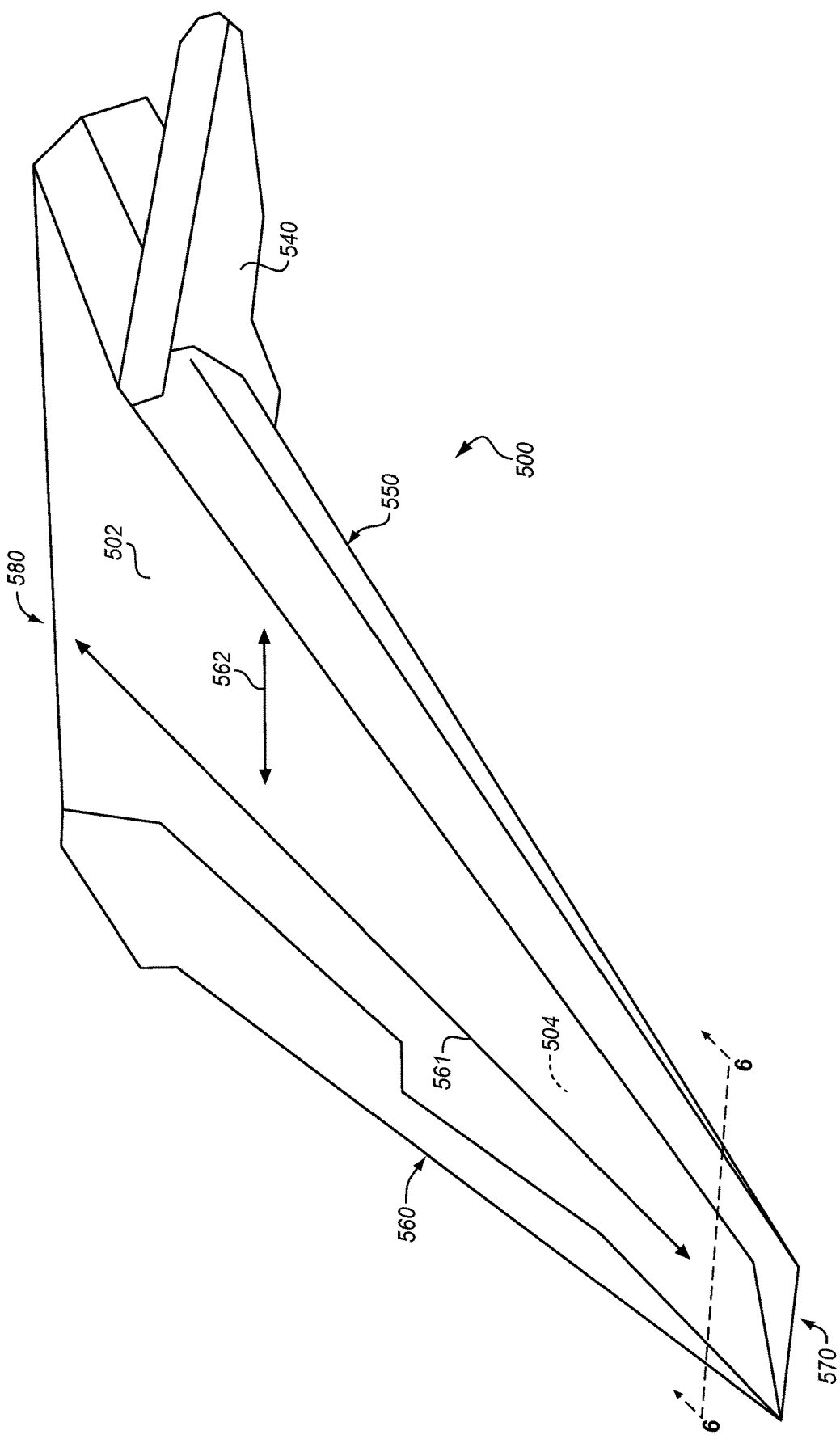
FIG. 5 is a perspective view of a fully assembled wing in an illustrative embodiment.

FIG. 5 is a perspective view of a fully assembled wing 500 in an illustrative embodiment, which includes a wing root 580 and a wing tip 570. Wing 500 may be assembled from an upper wing panel 502 and a lower wing panel 504 as well as a leading edge 550 and a trailing edge 560, as well as structures such as slats (not shown) and fillet panels (not shown) and engine pylon 540 on the leading edge 550 and flaps (not shown) and other structures on the trailing edge 560. Spanwise 561 and chordwise 562 correspond to spanwise 159 and chordwise 169, respectively, as used above.

Figure 6:
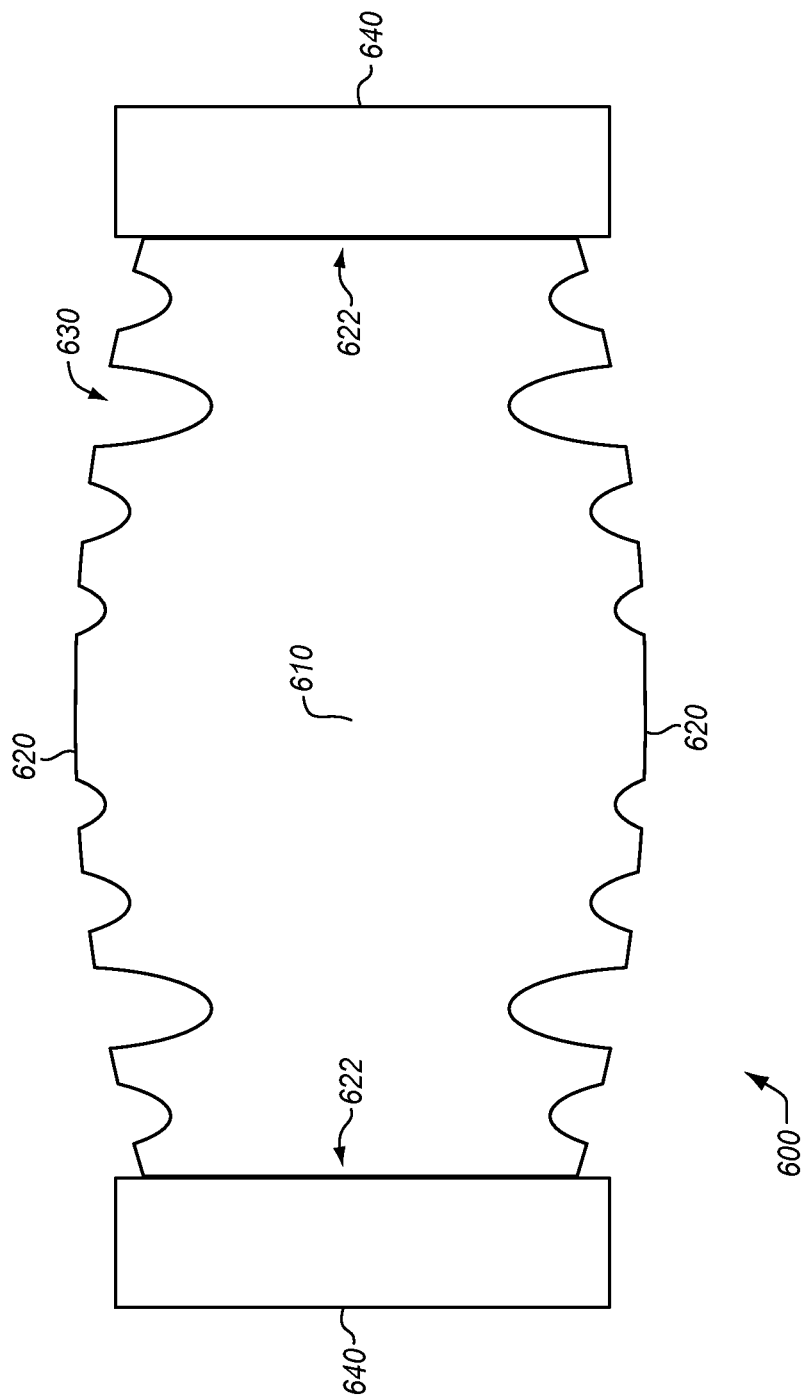
FIG. 6 is a view of a rib in an illustrative embodiment.

FIG. 6 is a view of a rib 600 in an illustrative embodiment. In this embodiment, rib 600 includes a web 610, as well as flanges 620 for attachment to a skin of a wing (not shown). Sides 622 of the rib 600 are dimensioned for attachment to spars 640. The rib 600 also includes mouse holes 630 which accommodate stringers, cabling, and other components.

Figure 7:
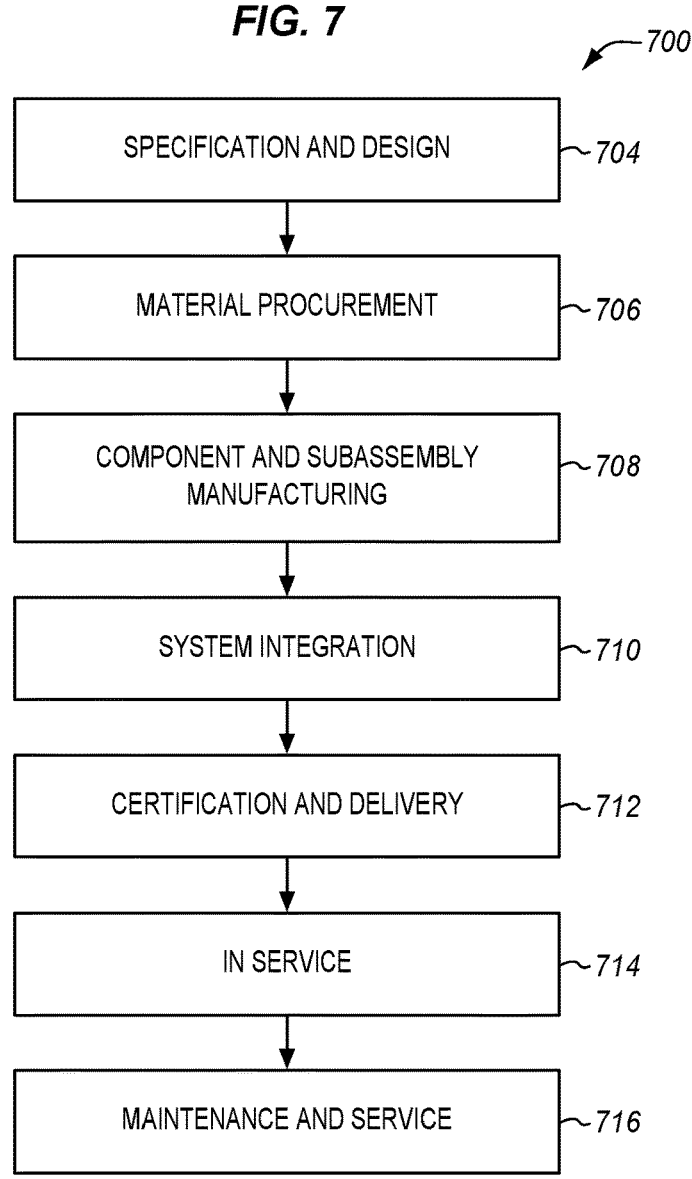
FIG. 7 is a flow diagram of aircraft production and service methodology in an illustrative embodiment.
Figure 8:
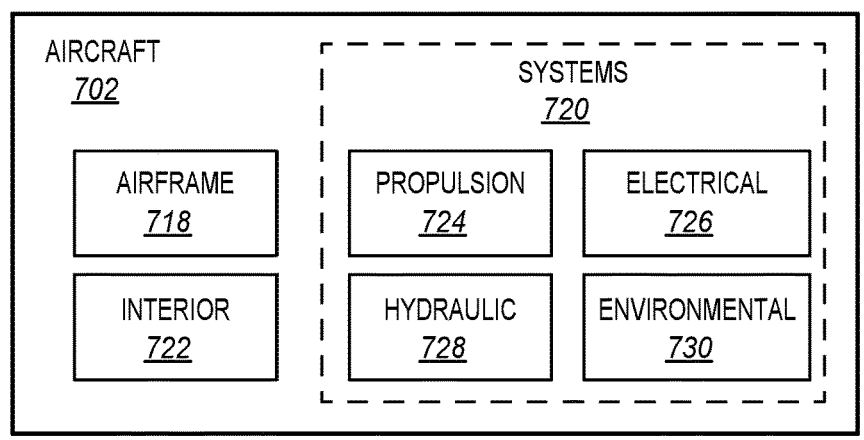
FIG. 8 is a block diagram of an aircraft in an illustrative embodiment.

Referring more particularly to the drawings, embodiments of the disclosure may be described in the context of aircraft manufacturing and service in method 700 as shown in FIG. 7 and an aircraft 702 as shown in FIG. 8. During preproduction, method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine work in maintenance and service 716 (which may also include modification, reconfiguration, refurbishment, and so on). Apparatus and methods embodied herein may be employed during any one or more suitable stages of the production and service described in method 700 (e.g., specification and design 704, material procurement 706, component and subassembly manufacturing 708, system integration 710, certification and delivery 712, service 714, maintenance and service 716) and/or any suitable component of aircraft 702 (e.g., airframe 718, systems 720, interior 722, propulsion system 724, electrical system 726, hydraulic system 728, environmental system 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by method 700 may include an airframe 718 with a plurality of systems 720 and an interior 722. Examples of systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 700. For example, components or subassemblies corresponding to component and subassembly manufacturing 708 may be fabricated or manufactured in a manner similar to components or subassemblies produced while the aircraft 702 is in service. Also, one or more apparatus embodiments, method embodiments, or a combination thereof may be utilized during the subassembly manufacturing 708 and system integration 710, for example, by substantially expediting assembly of or reducing the cost of an aircraft 702. Similarly, one or more of apparatus embodiments, method embodiments, or a combination thereof may be utilized while the aircraft 702 is in service, for example and without limitation during the maintenance and service 716. Thus, the invention may be used in any stages discussed herein, or any combination thereof, such as specification and design 704, material procurement 706, component and subassembly manufacturing 708, system integration 710, certification and delivery 712, service 714, maintenance and service 716 and/or any suitable component of aircraft 702 (e.g., airframe 718, systems 720, interior 722, propulsion system 724, electrical system 726, hydraulic system 728, and/or environmental system 730).

In one embodiment, a part comprises a portion of airframe 718, and is manufactured during component and subassembly manufacturing 708. The part may then be assembled into an aircraft in system integration 710, and then be utilized in service 714 until wear renders the part unusable. Then, in maintenance and service 716, the part may be discarded and replaced with a newly manufactured part. Inventive components and methods may be utilized throughout component and subassembly manufacturing 708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Further, the disclosure comprises embodiments according to the following clauses:

Clause 1. A method for assembly line (100) processing of aircraft wing panels (150), said method comprising: inputting wing panels (150) into an assembly line (100), the assembly line (100) having a number of work stations (120), the wing panels (150) oriented such that leading edges (155) are all on a first side (166) of the work stations (120), and trailing edges (157) are all on a second side (165) of the work stations (120); and advancing the wing panels (150) in a process direction (181) through the number of work stations (120), at least a first portion of the work stations (120) dedicated to wing panel leading edge (155) processing, and a second portion of the work stations (120) dedicated to wing panel trailing edge (157) processing.

Clause 2. A method according to clause 1 wherein inputting wing panels (150) into an assembly line (100) comprises inputting wing panels (150) into the assembly line (100) such that wing root sections (150-3) are adjacent, said method further comprising operating at least one work station (120) that is dedicated to wing root section (150-3) processing.

Clause 3. A method according to clause 2 wherein operating at least one work station (120) that is dedicated to wing root (150-3) processing comprises processing wing root sections (150-3) of two adjacent wing panels (150) simultaneously.

Clause 4. A method according to clause 1 wherein inputting wing panels (150) into an assembly line (100) comprises inputting wing panels (150) into the assembly line (100) such that wing tip sections (150-1) are adjacent, said method further comprising operating at least one work station (120) that is dedicated to wing tip section (150-1) processing.

Clause 5. A method according to clause 4 wherein operating at least one work station (120) that is dedicated to wing tip (150-1) processing comprises processing wing tip sections (150-1) of two adjacent wing panels (150) simultaneously.

Clause 6. A method according to clause 1 wherein inputting wing panels (150) into an assembly line (100) comprises inputting left wing upper panels, left wing lower panels, right wing upper panels, and right wing lower panels into the assembly line (100), with all leading edges (155) oriented to a first side (166) of the work stations (120).

Clause 7. A method according to clause 1 wherein advancing the wing panels (150) in a process direction comprises one of continuously advancing the wing panels (150) in the process direction (181) and pulsing the wing panels (150) in the process direction (181), with work occurring on the wing panels (150) at the plurality of work stations (120) based on a combination of work station (120) capability and a section of wing panel (150) within an individual work station (120).

Clause 8. A method according to clause 7 wherein the work occurring includes one or more of: drilling, trimming, inspecting, painting, sealing, cutting wing panel access openings, installing wing panel access doors, laying down sacrificial plies, machining sacrificial plies, reworking material, installing wing ribs (600), and attaching components to the wing panels (150).

Clause 9. The method of clause 1 wherein inputting wing panels (150) into an assembly line (100) comprises utilizing strong backs (140) to enforce contours (167) onto the wing panels (150).

Clause 10. The method of clause 1 wherein inputting wing panels (150) into an assembly line (100) comprises inputting wing panels (150) for different aircraft models into the assembly line (100) such that wing panels (150) for different aircraft models are inputted adjacent to one another.

Clause 11. The method of clause 1 wherein advancing the wing panel (150) comprises indexing at least one indexing feature (142) associated with the wing panel (150) to an indexing unit (112) in the assembly line (100).

Clause 12. The method of clause 1 wherein advancing the wing panel (150) comprises indexing a shuttle (130) having at least one indexing feature (142) associated with the wing panel (150) to an indexing unit (112) in the assembly line (100), the shuttle operable for moving the wing panel (150) along the assembly line (100).

Clause 13. The method according to clause 1 further comprising operating the work stations (120) to track the wing panel (150) through a work range (123) associated with the work station (120).

Clause 14. A portion of an aircraft assembled according to the method of clause 1.

Clause 15. An assembly line (100) for processing wing panels (150) for an aircraft (10), the assembly line (100) comprising: a track (110) that proceeds in a process direction (181); a plurality of work stations (120) that are distributed in the process direction (181) along the track (110), the work stations (120) having a first side (166) and a second side (165), a portion of the work stations (120) on the first side (166) dedicated to leading edge (155) wing panel (150) processing, a portion of the work stations (120) on the second side (165) dedicated to trailing edge (157) wing panel (150) processing; and a plurality of strong backs (140) operable to engage the wing panels (150) and move the wing panels (150) along the track (110) past the plurality of work stations (120).

Clause 16. The assembly line (100) according to clause 15 wherein the strong backs (140) comprise pogos (160) operable to enforce contours (167) onto the wing panels (150).

Clause 17. The assembly line (100) according to clause 16 further comprising a plurality of shuttles (130), each shuttle (130) operable to move an associated strong back (140) along the track (110).

Clause 18. The assembly line (100) according to claim 15 wherein:
a first portion of the work stations (120) are operable to process wing root sections (150-3) of the wing panels (150), the first portion of work stations (120) further operable to process wing root sections (150-3) of two wing panels (150) simultaneously, when the wing root sections (150-3) are disposed adjacent to one another along the track (110); and a second portion of the work stations (120) are operable to process wing tip sections (150-1) of the wing panels (150), the second portion of work stations (120) further operable to process wing tip sections (150-1) of two wing panels (150) simultaneously, when wing tip sections (150-1) are disposed adjacent to one another along the track (110).

Clause 19. The assembly line (100) of clause 15 wherein the strong backs (140) and the work stations (120) are operable to process a wing panel (150) for a first model of aircraft (10) and a wing panel (150) for a second model of aircraft (10) disposed in the assembly line (100) adjacent to one another.

Clause 20. The assembly line (100) of clause 15 wherein the strong backs (140) are configured to engage the wing panels (150) such that any of a left wing upper panel, a left wing lower panel, a right wing upper panel, and a right wing lower panel are disposed with the leading edge (155) on the same side of the work stations (120).

Clause 21. The assembly line (100) of clause 15 wherein the work stations (120) perform operations selected from the group consisting of: drilling, trimming, inspecting, painting, sealing, cutting wing panel access openings, installing wing panel access doors, laying down sacrificial plies, machining sacrificial plies, reworking material, installing wing ribs, and attaching components to the wing panels (150).

Clause 22. The assembly line (100) of clause 15 wherein at least a portion of the work stations (120) comprise end effectors (122), the end effectors (122) operable to move relative to the wing panels (150).

Clause 23. The assembly line (100) of clause 15 wherein said work stations (120) comprise an indexing unit (112), said indexing units (112) operable to interact with indexing features (142) that are associated with the wing panels (150) to control the advancing of the wing panels (150).

Clause 24. The assembly line of clause 23 further comprising a plurality of shuttles (130), each shuttle (130) operable to move an associated strong back (140) along the track (110), the indexing features (142) disposed on the plurality of strong backs (140) and indexed to the wing panel (150) supported by said strong back (140).

Clause 25. The assembly line (100) of clause 24 wherein the shuttles (130) are configured to continuously advance the wing panels (150) in the process direction (181) with work occurring on the wing panels (150) at the plurality of work stations (120).

Clause 26. The assembly line (100) of clause 24 wherein the shuttles (130) are configured to pulse the wing panels (150) in the process direction (181) with work occurring on the wing panels (150) at the plurality of work stations (120).

Clause 27. The assembly line (100) according to clause 15 wherein said work stations (120) operate (120) to track the wing panel (150) through a work range (123) associated with the work station (120).

Clause 28. Fabricating a portion of an aircraft (10) using the assembly line (100) of clause 15.

Clause 29. A method for processing aircraft wing panels (150), the method comprising: securing a first wing panel (150) to a first strong back (140) that enforces a contour (167) onto the first wing panel (150); moving the first strong back (140) along a track (110) while the first wing panel (150) is oriented with a leading edge (155) towards a first side (166) of a work station (120) associated with the track (110); securing a second wing panel (150) to a second strong back (140) that enforces a contour (167) onto the second wing panel (150); and moving the second strong back (140) along the track (110) while the second wing panel (150) is oriented with a trailing edge (157) toward a second side (165) of the work station (120), the second wing panel (150) and the first wing panel (150) oriented wing tip section (150-1) to wing tip section (150-1) or wing root section (150-3) to wing root section (150-3).

Clause 30. The method according to clause 29 further comprising: continuing to move the first strong back (140) and second strong back (140) along the track (110); and operating additional work stations (120) disposed along the track (110) to perform work upon the first wing panel (150) and the second wing panel (150).

Clause 31. An apparatus for assembling wing panels (150), the apparatus comprising: strong backs (140) that suspend the wing panels (150) while enforcing contours (167) onto the wing panels (150); a track (110) along which the strong backs (140) are transported; and a plurality of work stations (120) disposed along the track (110), multiple of the work stations (120) processing a single wing panel (150) at the same time.

Clause 32. The apparatus of clause 31 wherein the wing panels (150) are suspended such that leading edges (155) of the wing panels (150) are oriented to a first side (166) of the work stations (120), and the trailing edges (157) of the wing panels (150) are oriented to a second side (165) of the work stations (120).

Although specific embodiments are described herein, the scope of the disclosure is not limited to those specific embodiments. The scope of the disclosure is defined by the following clauses and any equivalents thereof.

What is claimed is:

1. A method for assembly line processing of aircraft wing panels, said method comprising:
   inputting wing panels in series into an assembly line, the assembly line having a number of work stations, the wing panels oriented such that leading edges are all on a first side of the work stations, and trailing edges are all on a second side of the work stations, wherein inputting the wing panels in series into the assembly line comprises inputting wing panels in series into the assembly line such that at least one of two wing root sections of consecutive wing panels in the series are adjacent or two wing tip sections of consecutive wing panels in the series are adjacent;
   advancing the wing panels in a process direction through the number of work stations, at least a first portion of the work stations dedicated to wing panel leading edge processing, and a second portion of the work stations dedicated to wing panel trailing edge processing; and
   operating at least one work station configured to perform wing root section processing or wing tip section processing, wherein wing root processing comprises processing wing root sections of two adjacent wing panels simultaneously and wing tip processing comprises processing wing tip sections of two adjacent wing panels simultaneously.

2. A method according to claim 1 wherein inputting wing panels into an assembly line comprises inputting left wing upper panels, left wing lower panels, right wing upper panels, and right wing lower panels into the assembly line, with all leading edges oriented to a first side of the work stations.

3. The method of claim 1 wherein inputting wing panels into an assembly line comprises utilizing strong backs to enforce contours onto the wing panels.

4. The method of claim 1 wherein inputting wing panels into an assembly line comprises inputting wing panels for different aircraft models into the assembly line such that wing panels for different aircraft models are inputted adjacent to one another.

5. The method of claim 1 wherein advancing the wing panels comprises indexing at least one indexing feature associated with a wing panel of the wing panels to an indexing unit in the assembly line.

6. The method of claim 1 wherein advancing the wing panels comprises indexing a shuttle having at least one indexing feature associated with a wing panel of the wing panels to an indexing unit in the assembly line, the shuttle operable for moving the wing panel along the assembly line.

7. The method according to claim 1 further comprising operating the work stations to track the wing panels through a work range associated with the work stations.

8. A method according to claim 1 wherein advancing the wing panels in a process direction comprises one of continuously advancing the wing panels in the process direction and pulsing the wing panels in the process direction, with work occurring on the wing panels at the number of work stations based on a combination of work station capability and a section of wing panel within an individual work station, and multiple work stations of the number of work stations can work on the same wing panel during the continuously advancing of the wing panels in the process direction or during a pause in the pulsing of the wing panels in the process direction.

9. A method according to claim 8 wherein the work occurring includes one or more of:
   drilling, trimming, inspecting, painting, sealing, cutting wing panel access openings, installing wing panel access doors, laying down sacrificial plies, machining sacrificial plies, reworking material, installing wing ribs, and attaching components to the wing panels.

10. An assembly line for processing wing panels for an aircraft, the assembly line comprising: a track parallel to a process direction, wherein wing panels are arranged in series along the track in the process direction and consecutive wing panels in the series are oriented wing tip section to wing tip section or wing root section to wing root section; a plurality of work stations that are distributed in the process direction along the track, wherein multiple work stations of the plurality of work stations process a single wing panel during a same pause between pulses or during continuous advancement of the wing panels along the track through the plurality of work stations, the work stations having a first side and a second side, a portion of the work stations on the first side dedicated to leading edge wing panel processing, a portion of the work stations on the second side dedicated to trailing edge wing panel processing, each work station of the plurality of work stations configured to perform a different type of operation, wherein: a first set of the work stations is configured to process wing root sections of the wing panels, the wing panels arranged in series in the process direction, at least one work station of the first set of the work stations further operable to process wing root sections of two consecutive wing panels in the series simultaneously, when the wing root sections are disposed adjacent to one another along the track; and a second set of the work stations is configured to process wing tip sections of the wing panels, at least one work station of the second set of the work stations further operable to process wing tip sections of two consecutive wing panels in the series simultaneously, when wing tip sections are disposed adjacent to one another along the track; and a plurality of strong backs operable to engage the wing panels and advance the wing panels along the track through the plurality of work stations.

11. The assembly line of claim 10 wherein the strong backs and the work stations are operable to process a wing panel for a first model of aircraft and a wing panel for a second model of aircraft disposed in the assembly line adjacent to one another.

12. The assembly line of claim 10 wherein the strong backs are configured to engage the wing panels such that any of a left wing upper panel, a left wing lower panel, a right wing upper panel, and a right wing lower panel are disposed with a leading edge on the same side of the work stations.

13. The assembly line of claim 10 wherein the work stations perform operations selected from the group consisting of: drilling, trimming, inspecting, painting, sealing, cutting wing panel access openings, installing wing panel access doors, laying down sacrificial plies, machining sacrificial plies, reworking material, installing wing ribs, and attaching components to the wing panels.

14. The assembly line of claim 10 wherein at least a portion of the work stations comprise end effectors, the end effectors operable to move relative to the wing panels.

15. The assembly line according to claim 10 wherein said work stations operate to track the wing panels through a work range associated with the work stations.

16. The assembly line according to claim 10 wherein the strong backs comprise pogos operable to enforce contours onto the wing panels.

17. The assembly line according to claim 16 further comprising a plurality of shuttles, each shuttle operable to move an associated strong back along the track.

18. The assembly line of claim 10 wherein said work stations comprise an indexing unit, said indexing units operable to interact with indexing features that are associated with the wing panels to control advancing of the wing panels.

19. The assembly line of claim 18 further comprising a plurality of shuttles, each shuttle operable to move an associated strong back along the track, the indexing features disposed on the plurality of strong backs and indexed to a wing panel supported by said strong back.

20. The assembly line of claim 19 wherein the shuttles are configured to continuously advance the wing panels in the process direction with work occurring on the wing panels at the plurality of work stations.

21. The assembly line of claim 19 wherein the shuttles are configured to pulse the wing panels in the process direction with work occurring on the wing panels at the plurality of work stations.

22. A method for processing aircraft wing panels, the method comprising:
   securing a first wing panel to a first strong back that enforces a contour onto the first wing panel;
   moving the first strong back along a track in a process direction while the first wing panel is oriented with a leading edge towards a first side of a work station associated with the track;
   securing a second wing panel to a second strong back that enforces a contour onto the second wing panel;
   moving the second strong back along the track in the process direction while the second wing panel is oriented with a trailing edge toward a second side of the work station, the first strong back and the first wing panel arranged in series and consecutive with the second strong back and the second wing panel along the track in the process direction, the second wing panel and the first wing panel oriented wing tip section to wing tip section or wing root section to wing root section; and
   operating the work station configured to perform wing root section processing or wing tip section processing, wherein wing root processing comprises processing wing root sections of the first wing panel and the second wing panel simultaneously and wing tip processing comprises processing wing tip sections of the first wing panel and the second wing panel simultaneously.

23. The method according to claim 22 further comprising:
   continuing to move the first strong back and second strong back along the track; and
   operating additional work stations disposed along the track to perform work upon the first wing panel and the second wing panel.

24. An apparatus for assembling wing panels, the apparatus comprising:
   strong backs that suspend the wing panels while enforcing contours onto the wing panels;
   a track along which the strong backs with the suspended wing panels are transported in a process direction, wherein wing panels are arranged in series along the track in the process direction and consecutive wing panels in the series are oriented wing tip section to wing tip section or wing root section to wing root section; and
   a plurality of work stations disposed along the track, multiple work stations of the plurality of work stations processing a single wing panel at the same time during a same pause between pulses or during continuous advancement of the wing panels along the track through the plurality of work stations, wherein each work station of the plurality of work stations is configured to perform a different type of operation;
   wherein at least one work station of the plurality of work stations is further operable to process wing tip sections of two consecutive wing panels in the series simultaneously, when the wing tip sections are disposed adjacent to one another along the track or further operable to process wing root sections of two consecutive wing panels in the series simultaneously, when wing root sections are disposed adjacent to one another along the track.

25. The apparatus of claim 24 wherein the wing panels are suspended such that leading edges of the wing panels are oriented to a first side of the work stations, and trailing edges of the wing panels are oriented to a second side of the work stations.

26. The apparatus of claim 24 wherein the strong backs comprise pogos operable to enforce contours onto the wing panels.

27. The apparatus of claim 24 further comprising a plurality of shuttles, each shuttle operable to move an associated strong back along the track.

28. The apparatus of claim 24 wherein at least a portion of the plurality of work stations comprises end effectors, the end effectors operable to move relative to the wing panels.

29. The apparatus of claim 24 wherein the plurality of work stations operates to track the wing panels through a work range associated with the plurality of work stations.

* * * * *